(12) United States Patent
Reece et al.

(10) Patent No.: US 8,161,632 B2
(45) Date of Patent: Apr. 24, 2012

(54) FLIP SEAL APPARATUS AND SYSTEM AND METHOD FOR INFLATING A TIRE USING THE SAME

(75) Inventors: Robert Reece, Clarkston, MI (US); Lawrence J. Lawson, Troy, MI (US)

(73) Assignee: Android Industries LLC, Auburn Hills, MI (US)

( * ) Notice: Subject to any disclaimer, the term of this patent is extended or adjusted under 35 U.S.C. 154(b) by 1376 days.

(21) Appl. No.: 11/541,995

(22) Filed: Oct. 2, 2006

(65) Prior Publication Data
US 2007/0074823 A1    Apr. 5, 2007

Related U.S. Application Data

(60) Provisional application No. 60/722,754, filed on Sep. 30, 2005.

(51) Int. Cl.
*B23P 19/00* (2006.01)
(52) U.S. Cl. .............................. 29/802; 157/1.1; 152/415
(58) Field of Classification Search .................... 29/802; 157/1.1; 152/415
See application file for complete search history.

(56) References Cited

U.S. PATENT DOCUMENTS

| | | | |
|---|---|---|---|
| 3,552,469 A * | 1/1971 | Corless | 157/1.1 |
| 4,714,420 A | 12/1987 | Milisavljevic et al. | |
| 4,947,919 A | 8/1990 | Timlin | |
| 5,035,274 A * | 7/1991 | Kinnick et al. | 157/1.1 |
| 6,148,892 A * | 11/2000 | Koerner et al. | 157/1.1 |
| 6,463,982 B1 | 10/2002 | Doan | |
| 2005/0006031 A1 | 1/2005 | Pellerin et al. | |

FOREIGN PATENT DOCUMENTS

| | | |
|---|---|---|
| JP | 56-14706 | 2/1981 |
| JP | 56-49766 | 11/1981 |
| JP | 61-137002 | 8/1986 |

OTHER PUBLICATIONS

Office Action from Canadian Patent Office for Application 2623301 dated Mar. 12, 2010.
Office Action from China Patent Office dated May 12, 2010 for Application No. 200680036188.9.
Office Action from China Patent Office for Application 200680036188.9 dated Jan. 27, 2011.
Office Action from Japan Patent Office for Application No. 2008-533775 dated Dec. 7, 2010.
Office Action from Canadian Patent Office for Application 2,623,301 dated Apr. 12, 2011.
Office Action from Mexican Patent Office for Application MX/a/2008/004221 dated Apr. 1, 2011.

* cited by examiner

*Primary Examiner* — Derris Banks
*Assistant Examiner* — Azm Parvez
(74) *Attorney, Agent, or Firm* — Honigman Miller Schwartz and Cohn LLP

(57) ABSTRACT

An inflator device is disclosed. The inflator device includes a seal assembly that maintains, while sealing from ambient pressure, an open air passageway between a tire bead and wheel bead seat during an inflation procedure. A seal for the inflator device is also disclosed. The seal includes a ring-shape having a flexible inner periphery that is adapted to maintain, while sealing from ambient pressure, an open air passageway between a tire bead and wheel bead seat during an inflation procedure.

6 Claims, 21 Drawing Sheets

FLIP SEAL APPARATUS AND SYSTEM AND METHOD FOR INFLATING A TIRE USING THE SAME

RELATED APPLICATION

This disclosure claims the benefit of Provisional Patent Application No. 60/722,754, filed on Sep. 30, 2005.

FIELD

The present disclosure generally relates to inflators and more particularly to automated inflators for tires or the like.

BACKGROUND

Tire/wheel assembly facilities may incorporate one or more automated tire/wheel assembly lines for mounting vehicle tires onto vehicle wheels. This process typically involves, amongst other operations: (a) mounting of a tire onto a wheel, (b) inflating of the tire to the desired pressure, and (c) balancing of the tire/wheel assembly. Most of these operations, if not all, can be accomplished by use of an automated, quick-inflating technique by means of a robotic system or the like.

Although conventional techniques provide the benefit of quickly assembling a tire to a wheel, such techniques may require large quantities of air during the inflation process. Also, known inflation systems exert large forces on the tire bead and the wheel bead seat during the inflating step. In order to accommodate these large forces, heavy, robust structures are typically required for inflating a tire mounted to a wheel. A need therefore exists for a device, system, and quick inflating technique that overcomes the shortcomings of the prior art.

BRIEF DESCRIPTION OF THE DRAWINGS

The present disclosure will now be described, by way of example, with reference to the accompanying drawings, in which.

DETAILED DESCRIPTION

A tire/wheel assembly is shown generally at 10 and an inflator device is shown generally at 100 in FIGS. 1 and 3-5F, according to an embodiment. As illustrated, the tire/wheel assembly 10 includes a tire 12 and a wheel 14 that are positioned on an assembly line cart 50.

Figure 1:
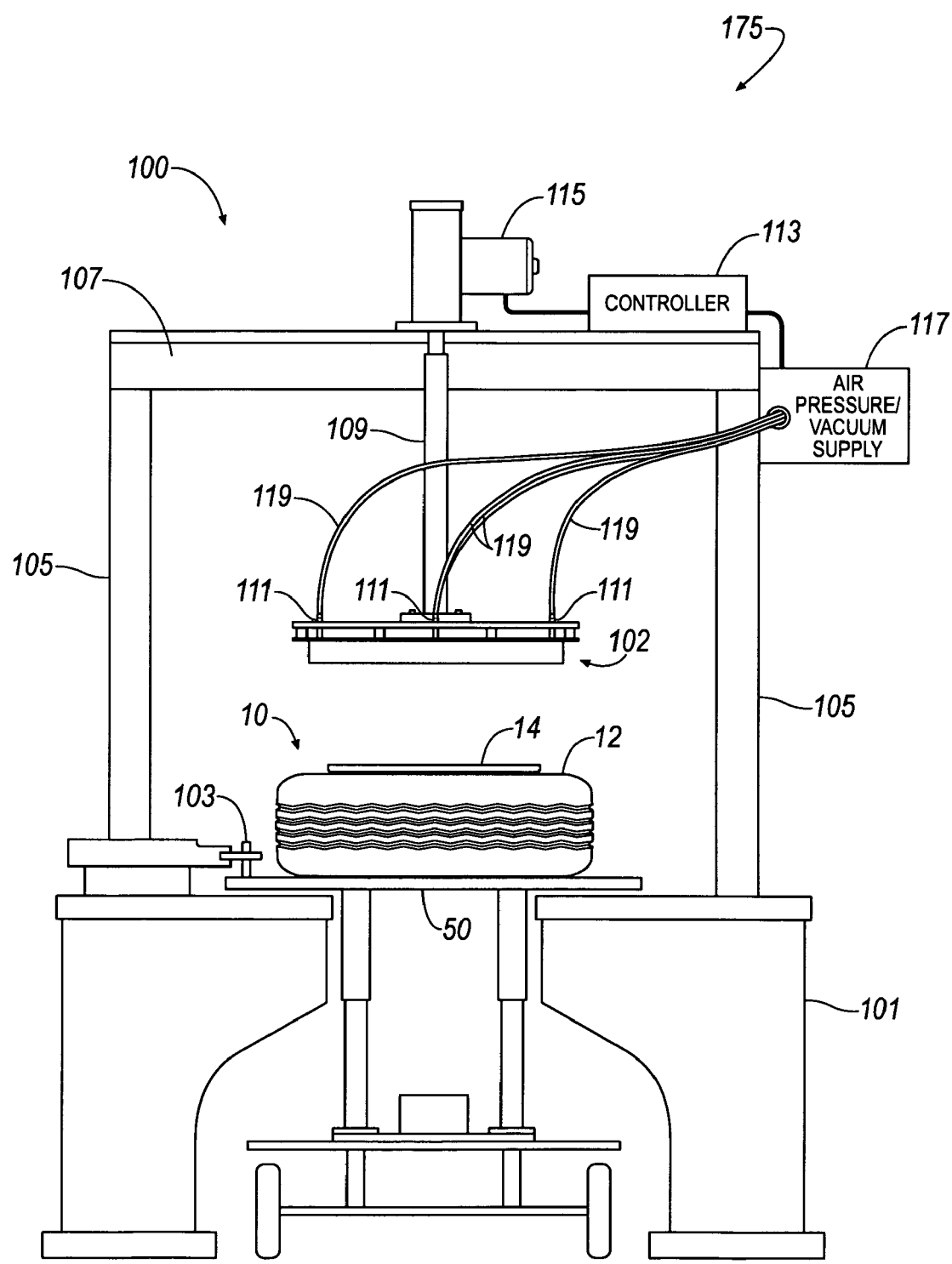
FIG. 1 is a front view of a tire/wheel assembly positioned on an assembly line cart that is located about an inflator system according to an embodiment.

As seen in FIG. 1, the inflator device 100 generally includes a base portion 101, a locking and retaining device 103 for locking and retaining the cart 50 to the base portion 101, a plurality of vertical support arms 105 extending from the base portion 101, a horizontal support portion 107 supported by the plurality of vertical support arms 105, a plunger portion 109 that adjusts the positioning of one or more inflators 111 relative the tire/wheel assembly 10, a controller 113, a motor 115 driven by the controller 113 to cause movement of the plunger portion 109, and an air pressure/vacuum supply 117 driven by the controller 113 to supply pressurized air through one or more hoses 119 to the respective one or more inflators 111 for inflating the tire 12.

According to an embodiment, the combination of the tire/wheel assembly 10, cart 50, and inflator device 100 defines a system 175 for inflating a tire 12 mounted to a wheel 14. According to an embodiment, the system 175 includes a device 102 (FIG. 2) that maintains, while sealing, from ambient pressure soundings, AP (FIGS. 5D, 5E), an open air passageway 125 (FIGS. 5B-5D) between a tire bead 16 and wheel bead seat 18 (FIGS. 3-5F) during an inflation procedure while also reducing/substantially eliminating large forces associated with conventional devices that were imparted to the tire bead 16 and wheel bead seat 18.

Figure 2:
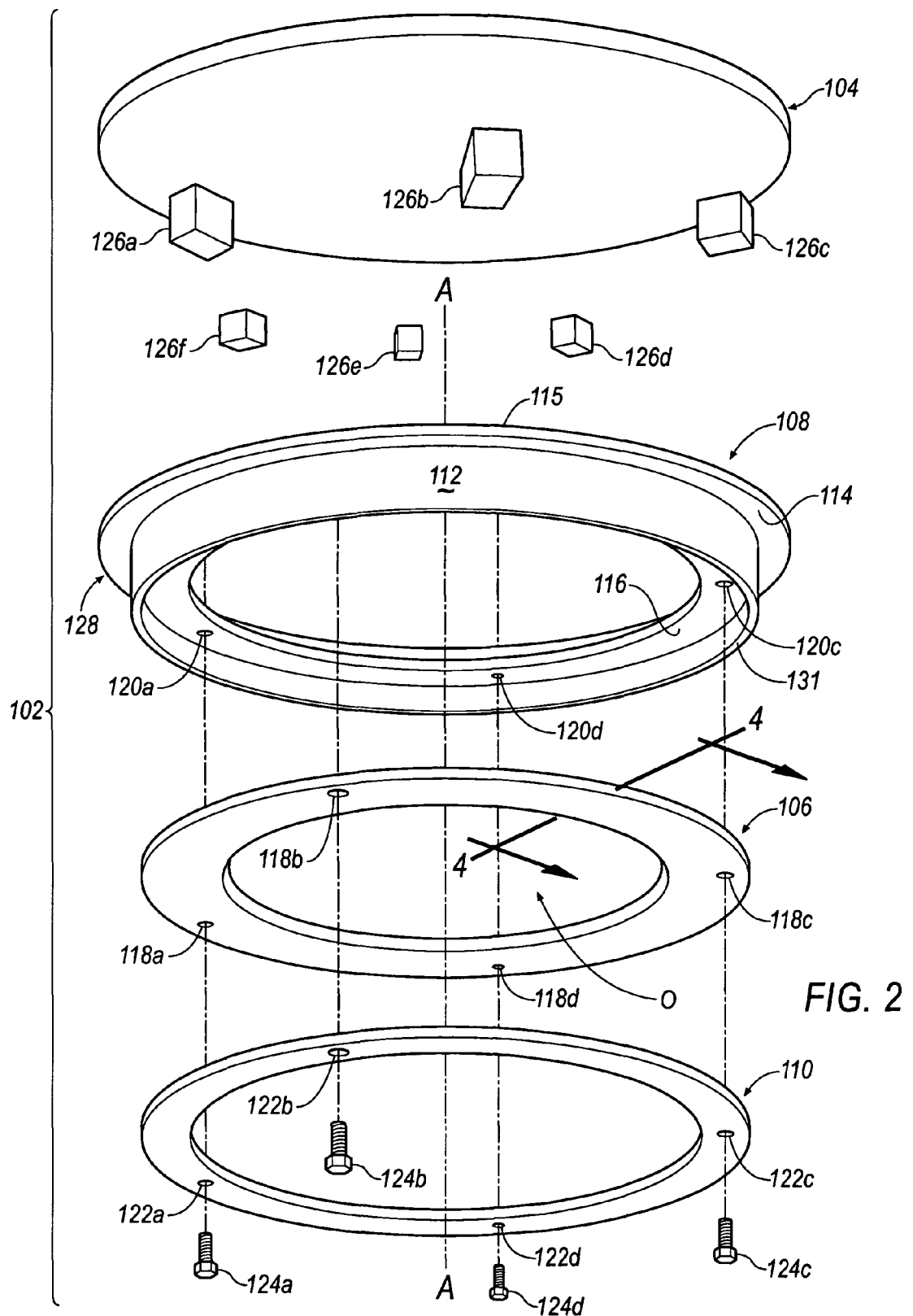
FIG. 2 is an exploded view of a flip seal assembly according to an embodiment.
Figure 5A:
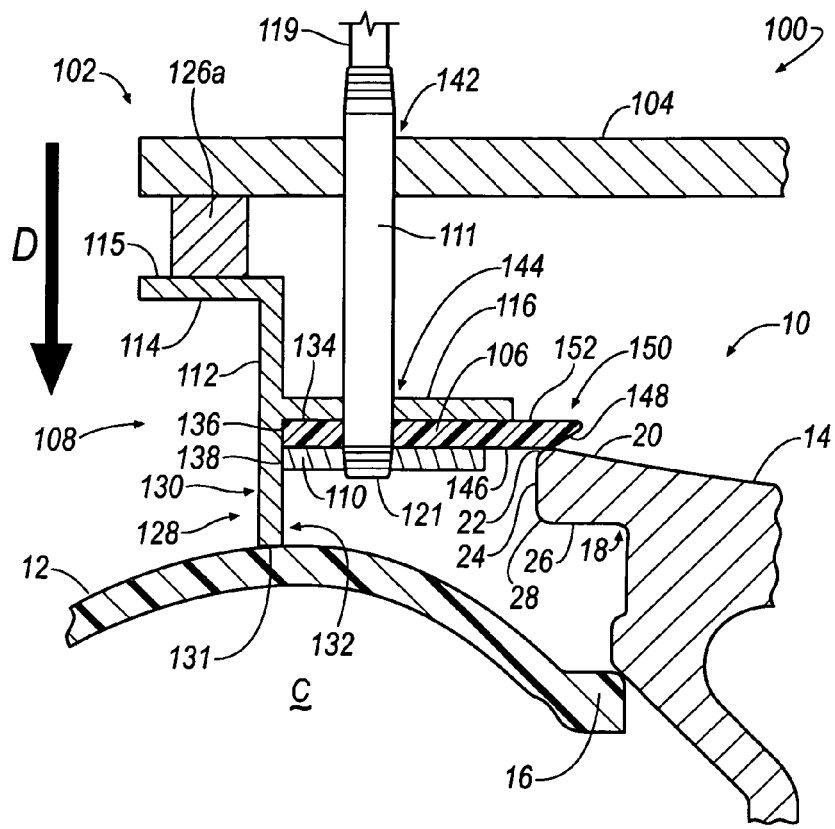
FIGS. 5A-5F are enlarged cross-sectional views of the tire/wheel assembly and flip seal according to line 5 of FIG. 4 showing a method for inflating a tire/wheel assembly according to an embodiment.
Figure 5B:
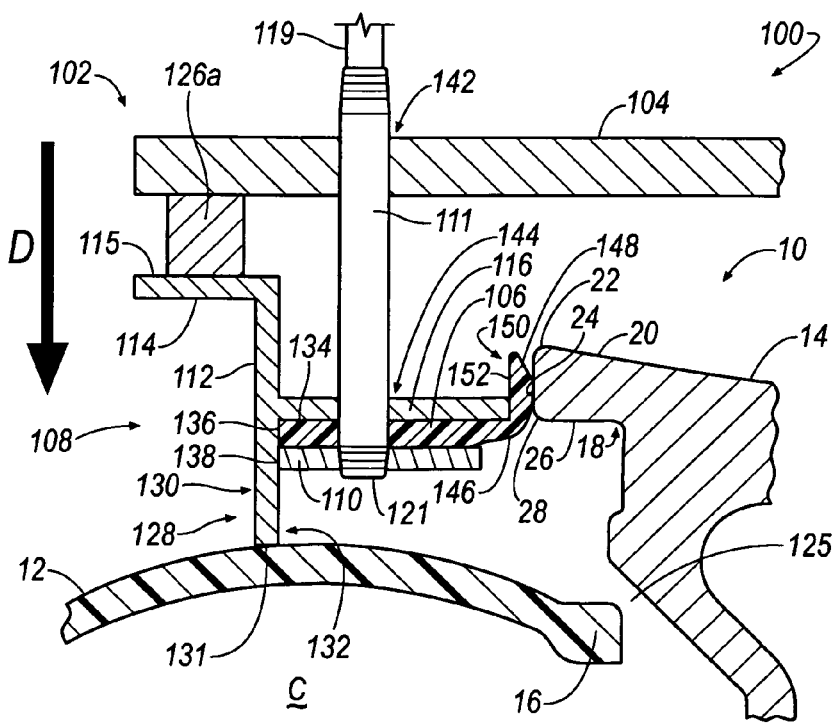
Figure 5C:
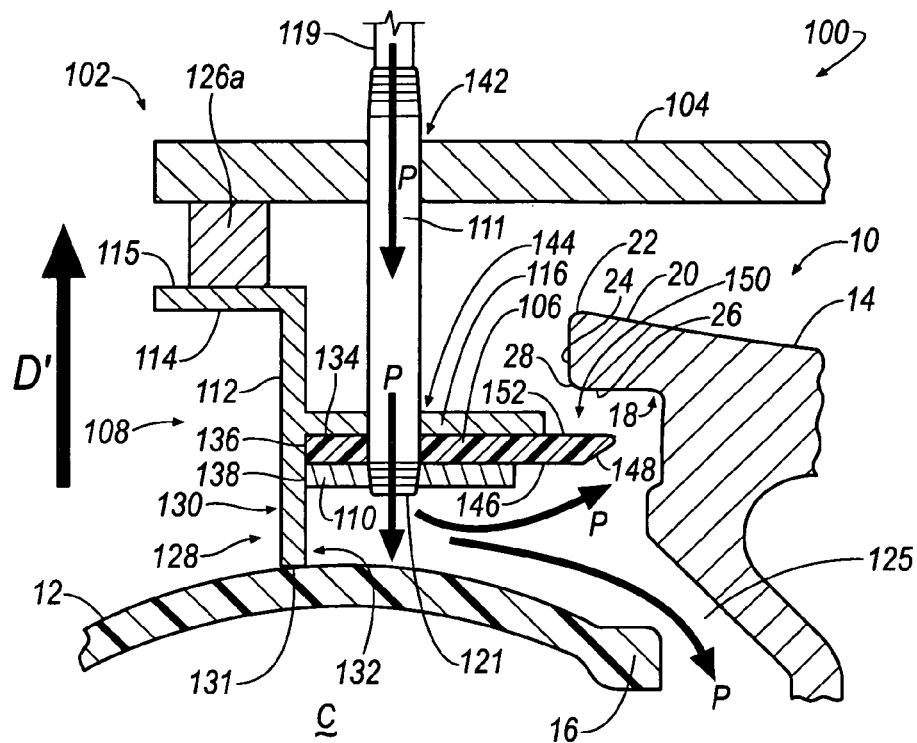
Figure 5D:
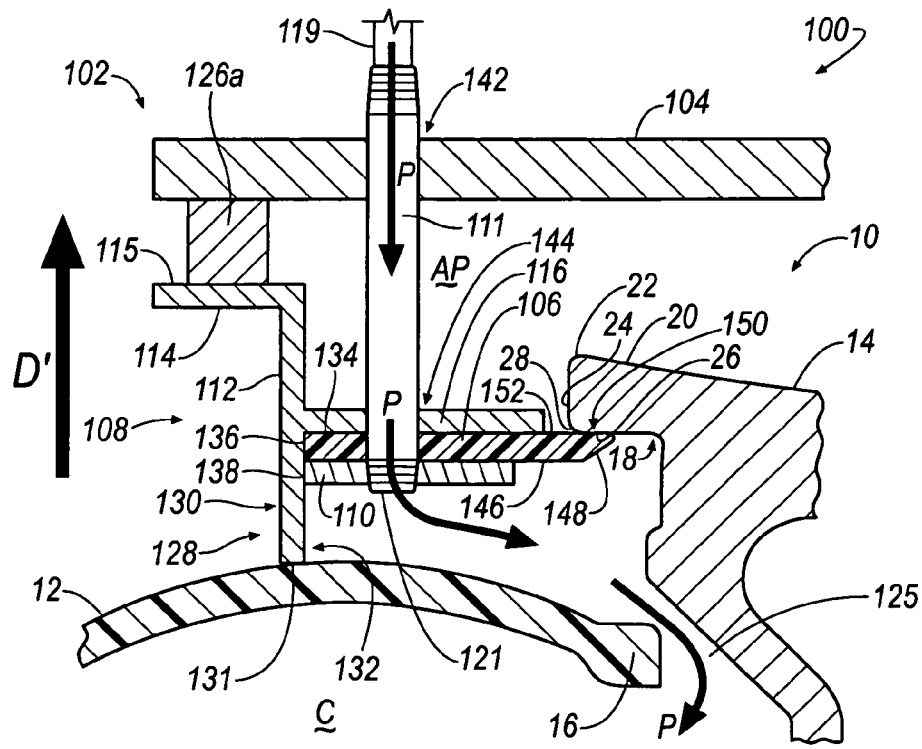
Figure 5E:
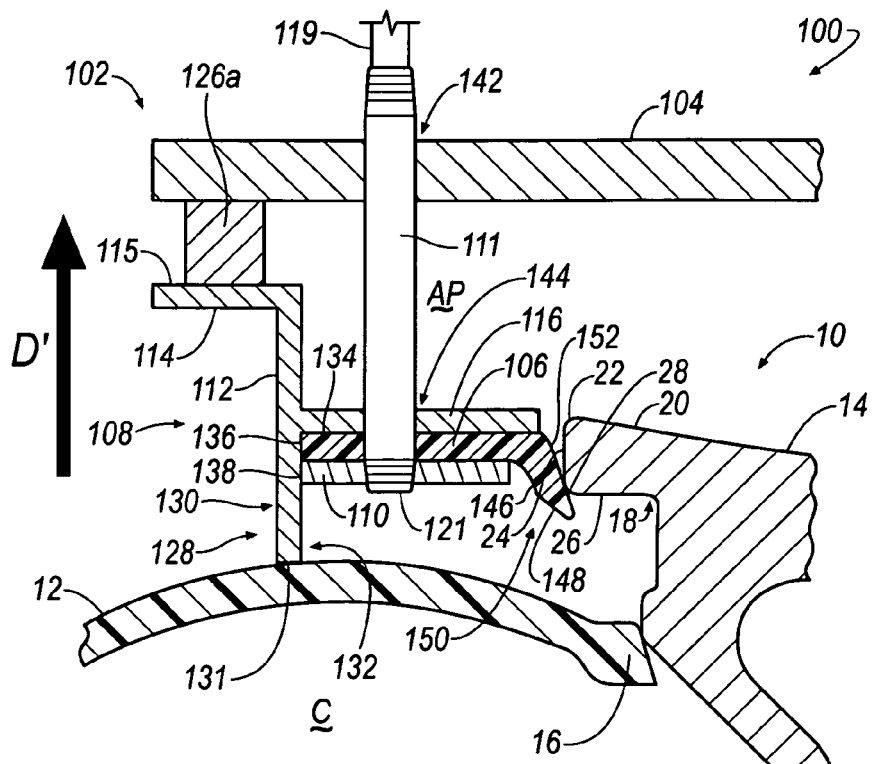

Referring to FIG. 2, the device 102 may be referred to as a "flip" seal assembly according to an upward orientation of a seal 106 shown in FIG. 5B and a downward orientation of the seal 106 shown in FIG. 5E. As illustrated, the flip seal assembly 102 includes a carrier plate 104, the flip seal 106, a carrier 108, and a retainer 110. The flip seal 106, carrier 108, and retainer 110 each generally include a circular, ring shape that are axially aligned with a central axis, A-A. The carrier 108 includes a rim portion 112 encompassing the central axis, A-A, a first radial portion 114 extending away from the rim portion 112 and central axis, A-A, and a second radial portion 116 extending from the rim portion 112 and toward the central axis, A-A.

Each of the flip seal 106, carrier 108, and retainer 110 may be joined by using any desirable method. According to an embodiment, the flip seal 106, carrier 108, and retainer 110 may be joined with any number of fasteners, adhesive, weld, or the like. According to the illustrated embodiment, the flip seal 106, carrier 108, and retainer 110 each include four passages 118a-118d, 120a-120d, and 122a-122d, respectively, for receiving, respectively, four threaded screw fasteners 124a-124d. However, it will be appreciated that any desirable number of passages 118a-118d, 120a-120d, 122a-122d and fasteners 124a-124d may be utilized to join the flip seal 106, carrier 108, and retainer 110.

The flip seal assembly 102 may optionally include spacers 126a-126f that are arranged between the carrier plate 104 and a top surface 115 of the first radial portion 114. However, it will be appreciated that the spacers 126a-126f may be eliminated and that the carrier plate 104 may directly abut the radial portion 114.

As illustrated in FIGS. 5A-5F, the carrier 108 generally includes a shroud portion 128 (FIGS. 5A-5F) that defines an outer periphery 130 of the carrier 108 and an inner periphery 132 of the carrier 108. According to an embodiment, the flip seal 106 is positioned about the inner periphery 132 of the carrier 108 and abuts an inner periphery surface 134 of the second radial portion 116 and an inner periphery surface 136 of the rim portion 112. Once the flip seal 106 is located against the carrier 108 as described above, the retainer 110 abuts and sandwiches the flip seal 106 with the second radial portion 116 of the carrier 108 with an end portion 138 of the retainer 110 abutting the inner periphery surface 136 of the rim portion 112.

Figure 3:
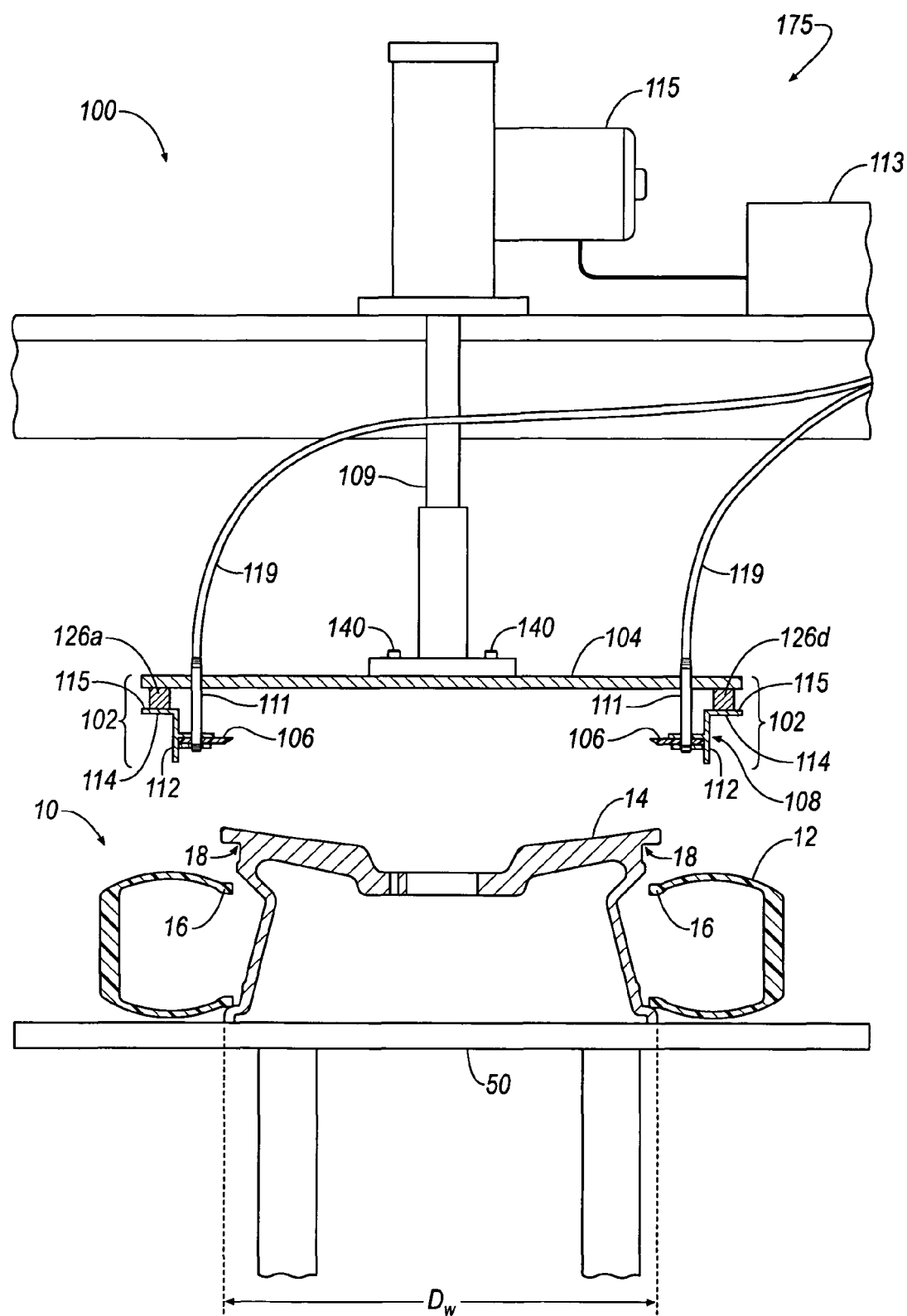
FIG. 3 is a cross-sectional view of a tire/wheel assembly and flip seal assembly in a first position according to an embodiment.
Figure 4:
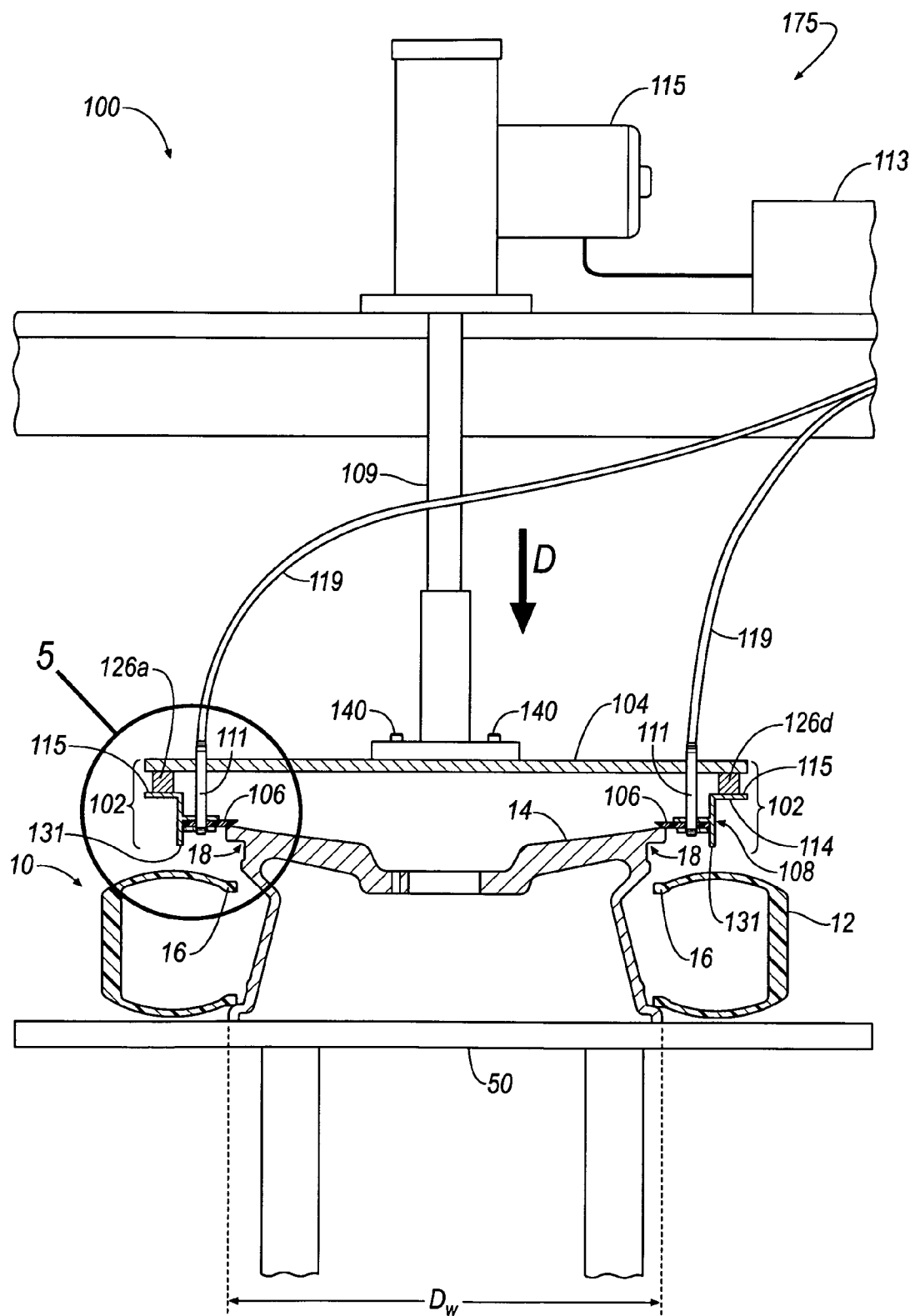
FIG. 4 is a cross-sectional view of the tire/wheel assembly and flip seal assembly of FIG. 3 in a second position according to an embodiment.

Referring to FIGS. 3 and 4, once the flip seal assembly 102 is arranged as described above, the carrier plate 104 of the flip seal assembly 102 is secured to the plunger portion 109 by, for example, one or more fasteners 140. Then, referring to FIGS. 5A-5F, the one or more inflators 111 may be inserted through one or more respective passages 142 formed in the carrier plate 104 and one or more passages, which are shown generally at 144, of the flip seal assembly 102. As illustrated, passages are formed, respectively, in axial alignment, in each of the flip seal 106, carrier 108, and retainer 110 to define the one or more passages 144.

Referring now to FIGS. 3-5F, a method for inflating a tire 12 using the one or more inflators 111 and flip seal assembly 102 of an inflator device 100 is described according to an embodiment. First, as seen in FIG. 3, the tire 12 is relaxed in an un-inflated state about the wheel 14 with the one or more inflators 111 and flip seal assembly 102 located in a disengaged position, above the tire/wheel assembly 10. Next, as shown in FIGS. 4 and 5A, the plunger portion 109 lowers the one or more inflators 111 and flip seal assembly 102 in the direction of the arrow, D, to a first position of engagement with the tire 12 and wheel 14 of the tire/wheel assembly 10 such that: (a) a circumferential end 131 of the rim portion 112 engages the tire 12, and (b) an inboard side 146 (FIG. 5A) of the flip seal 106 engages an outboard surface 20 of the flange of the wheel.

As the plunger portion 109 continues to move inflators 111 and flip seal assembly 102 in the direction of the arrow, D, the inboard side 146, and subsequently, an inner periphery side portion 148 of the flip seal 106 slides over an outboard corner 22 of the flange of the wheel, which then causes, as shown in FIG. 5B, the inboard side 146 of the flip seal 106 to engage a portion of a circumferential perimeter 24 of the flange of the wheel. Accordingly, in this orientation, a flexible inner periphery 150 of the flip seal 106 is "flipped" to move the flip seal 106 to a substantially L-shaped cross-sectional position of orientation (according to the view of FIG. 5B). Concurrently, the circumferential end 131 of the rim portion 112 causes the tire bead 16 to move away from the wheel bead seat 18 to provide the open air passageway 125 therebetween.

Once the flexible inner periphery 150 of the flip seal 106 is advanced past the circumferential perimeter 24 of the flange of the wheel in the direction of the arrow, D, the flip seal 106 is resiliently moved from the "flipped" position of FIG. 5B to an at-rest position, as shown in FIG. 5C. As shown in FIG. 5C, pressurized fluid, P, is fed through the one or more hoses 119 and out of one or more nozzles 121 of the one or more inflators 111 to commence a quick-inflating technique for inflating the tire 12 through the open air passageway 125 provided by the positioning of the circumferential end 131 of the rim portion 112 against the tire 12. It will be appreciated that the pressurized fluid, P, may be fed through the one or more hoses 119 before, during, or after the positioning of the flip seal 106 relative the tire/wheel assembly 10 shown in FIG. 5C (i.e. pressurized fluid, P, may be fed through the one or more hoses 119 at any time as shown in FIGS. 5A and 5B). It will be appreciated that the pressurized fluid, P, may include any desirable fluid, such as, for example, air, nitrogen, or the like.

As seen in FIG. 5C, once the flexible inner periphery 150 of the flip seal 106 is advanced past the circumferential perimeter 24 of the flange of the wheel as described above, the plunger portion 109 may begin to move the inflators 111 and flip seal assembly 102 in a direction according to the arrow, D', that is opposite the direction of the arrow, D. Accordingly, as seen in FIG. 5D, as the flip seal 106 is advanced toward the circumferential perimeter 24 of the flange of the wheel in the direction of the arrow, D', an outboard side 152 of the flip seal 106 engages an inboard surface 26 of the flange of the wheel. It will be appreciated that the tire 12 is rapidly and substantially inflated when the flip seal assembly 102 is positioned in the orientation as FIG. 5D due to the fact that the flip seal 106 seals the tire/wheel assembly 10 from ambient air pressure, AP. Depending on the number of inflators 111 utilized in the design of the inflator device 100, it may take as little as approximately 1 to 5 seconds to pressurize the tire 12 with the pressurized fluid, P.

Then, as seen in FIG. 5E, as the plunger portion 109 continues to move the one or more inflators 111 and flip seal assembly 102 in the direction of the arrow, D', the outboard side 152 of the flip seal 106 slides over an inboard corner 28 of the flange of the wheel, which then causes the outboard side 152 of the flip seal 106 to engage a portion of the circumferential perimeter 24 of the flange of the wheel. Accordingly, in this orientation, the flexible inner periphery 150 of the flip seal 106 is forced into a substantially inverted L-shaped cross-sectional position of orientation (according to the view of FIG. 5E). The lowered position of flip seal 106 in FIG. 5E is substantially the opposite of the raised position of the flip seal 106 as shown in FIG. 5B. Concurrently, with the assistance of the pressurized fluid, P, in a circumferential cavity, C, of the tire 12, the circumferential end 131 of the rim portion 112 is moved away from the tire bead 16 so as to allow the pressurized fluid, P, in the circumferential cavity, C, of the tire 12 to close off the open air passageway 125 and cause the tire bead 16 to seat itself in the wheel bead seat 18.

Figure 5F:
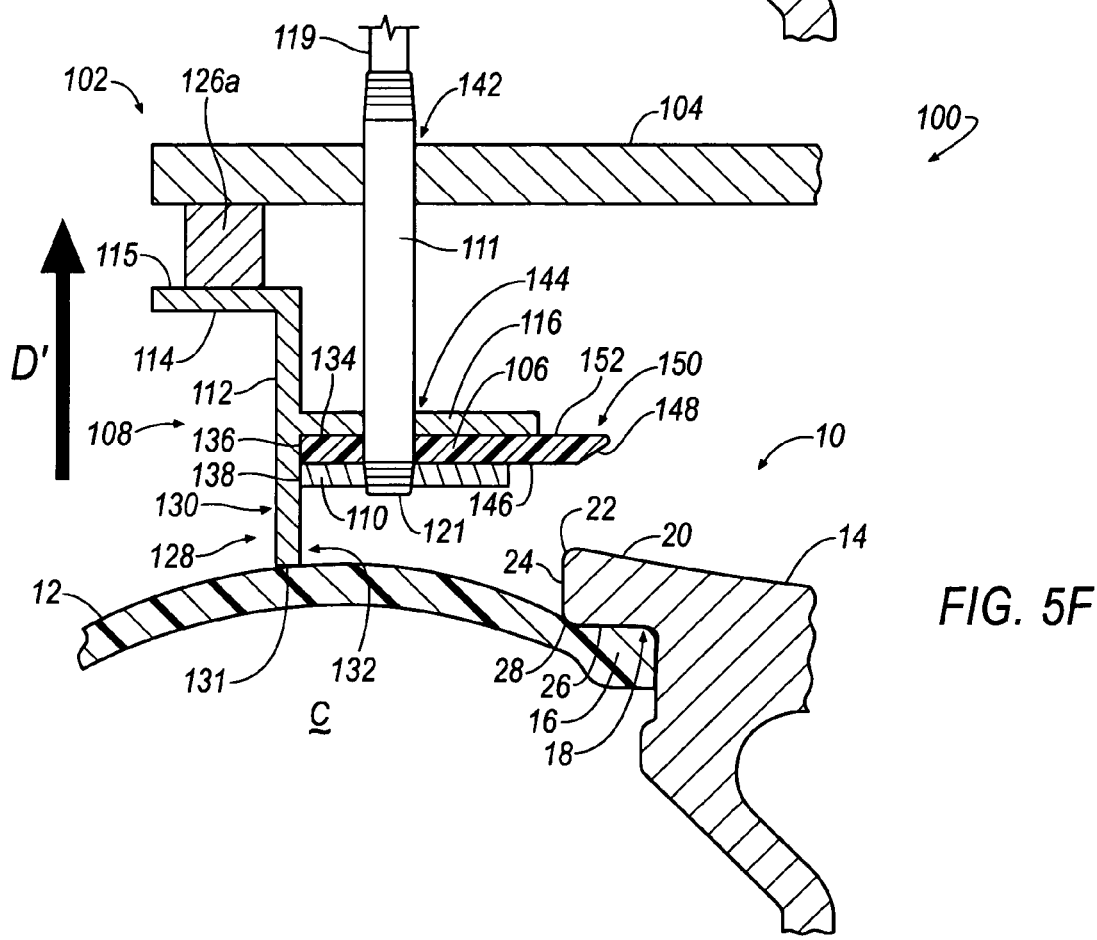

As the plunger portion 109 continues to move the one or more inflators 111 and flip seal assembly 102 in the direction of the arrow, D', the outboard side 152, and subsequently, the inner periphery side portion 148 of the flip seal 106 slides over the outboard corner 22 of the flange of the wheel, which then causes, as shown in FIG. 5F, the flexible inner periphery 150 of the flip seal 106 to resiliently move from the lowered position of FIG. 5E to an at-rest position similar to that as shown in FIG. 5A.

It will be appreciated that the supplying of the pressurized fluid, P, from the one or more nozzles 121 may be ceased before, during, or after a time when the one or more inflators 111 and flip seal 106 are positioned in a manner relative the tire/wheel assembly 10 as shown in FIG. 5E. If pressurized fluid, P, is still being provided from the one or more nozzles 121, the pressurized fluid, P, may be utilized alone, or, in combination with the plunger portion 109, to push the one or more inflators 111 and flip seal assembly 102 in the direction of the arrow, D', and away from the tire/wheel assembly 10 once the open air passageway 125 is closed off as described above.

Referring to FIGS. 6A-6D, alternate embodiments of the flip seal 106 are shown generally at 106a-106c according to an embodiment. Although the central axis, A-A, and a central opening, O, are provided as a frame of reference in FIGS. 6A-6D for comparison to the central opening, O, and central axis, A-A, in FIG. 2, the diameter of the central opening, O, of FIGS. 6A-6D does not represent an actual dimension of the flip seal 106a-106c, 106; it will be appreciated, however, that the diameter of the central opening, O, may include any desirable dimension so long as the central opening, O, is approximately equal to but less than the diameter of the wheel $D_w$ (FIGS. 3 and 4) to effect the sealing from ambient pressure, AP, as described in FIGS. 5D and 5E.

Figure 6A:
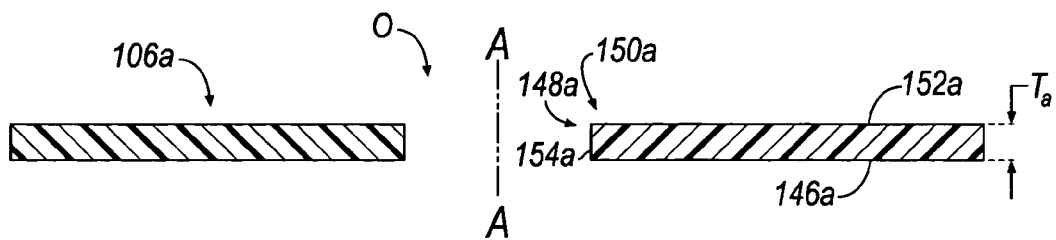
FIGS. 6A-6D illustrate a variety of geometries of flip seals for the flip seal assembly of FIG. 2 according to an embodiment.

As seen in FIG. 6A, the flip seal 106a includes a substantially uniform thickness, $T_a$, having no variation proximate its flexible inner periphery 150a. As illustrated, an inner periphery side portion 148a includes a substantially perpendicular edge 154a relative the inboard side 146a and outboard side 152a of the flip seal 106a.

Figure 6B:
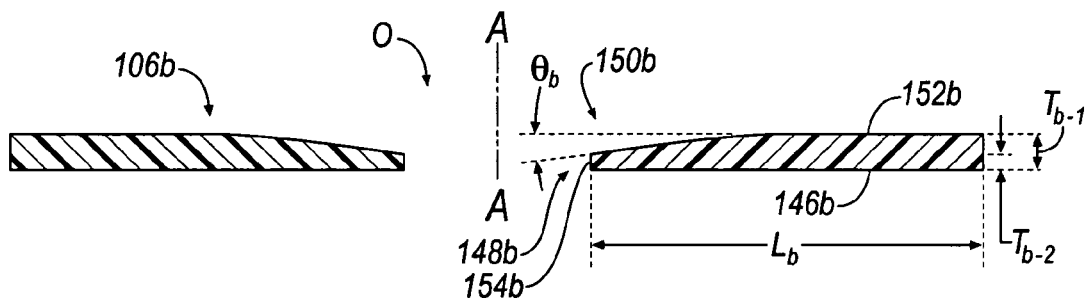

As seen in FIG. 6B, the flip seal 106b includes a substantially non-uniform thickness that may range from a first thickness, $T_{b-1}$, to a second thickness, $T_{b-2}$, that is proximate a flexible inner periphery 150b. As illustrated, an inner periphery side portion 148b includes a substantially perpendicular edge 154b relative the inboard side 146b and outboard side 152b of the flip seal 106b. According to an embodiment, the decrease in thickness may result in the outboard surface 152b being pitched at an angle, $\theta_b$, proximate the flexible inner periphery 150b. The angle, $\theta b$, may be approximately equal to, for example, 5°-15°.

Figure 6C:
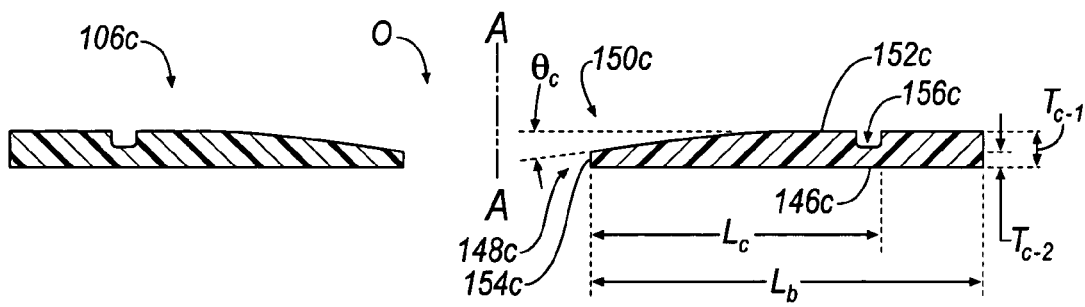

As seen in FIG. 6C, the flip seal 106c is substantially similar to the flip seal 106b, which includes a substantially non-uniform thickness that may range from a first thickness, $T_{c-1}$, to a second thickness, $T_{c-2}$, that is proximate a flexible inner periphery 150c. An inner periphery side portion 148c also includes a substantially perpendicular edge 154c relative the inboard side 146c and outboard side 152c of the flip seal 106c. According to an embodiment, the decrease in thickness may result in the outboard surface 152c being pitched at an angle, $\theta_c$, proximate the flexible inner periphery 150c. The angle, $\theta_c$, may be approximately equal to, for example, 5°-15°.

In addition, the flip seal 106c also includes a circumferential recess 156c disposed in the outboard side 152c of the flip seal 106. When no circumferential recess 156c is included (i.e., the flip seal appears as shown in FIG. 6B), a radius length, $L_b$, of the flip seal 106b defines a magnitude of a moment arm when the seal 106b is moved from an at-rest position of orientation to the flipped or positions of orientation. However, when the circumferential recess 156c is located along the radius length, $L_b$, the magnitude of the moment arm is reduced to a radius length, $L_c$. Accordingly, the reduction in magnitude of the moment arm effectively reduces the an amount of force applied to the flexible inner periphery 150c that is utilized to move the flip seal 106c to/from an at rest position to the flipped or positions of orientation as the flip seal 106c engages the wheel bead seat 18. Although the circumferential recess 156c is shown disposed in the outboard side 152c at a radius length, $L_c$, it will be appreciated that the circumferential recess 156c may be disposed in the inboard side 146c of the flip seal 106, and/or, at any desirable radius length, $L_c$, that is less than or greater than that as illustrated in FIG. 6C.

Figure 6D:
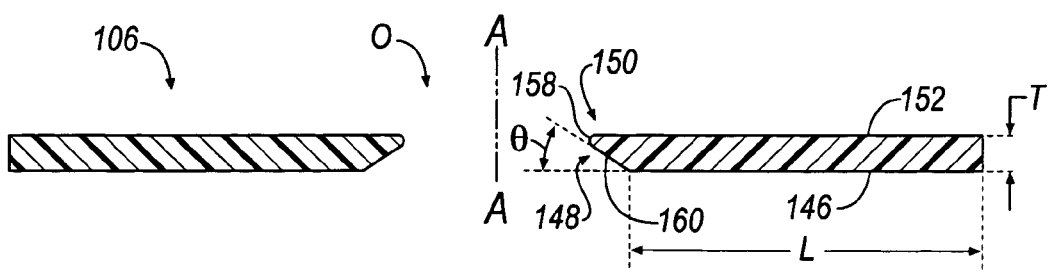

As seen in FIG. 6D, the flip seal 106 of FIGS. 1-5F is shown according to an embodiment. The flip seal 106 includes a substantially uniform thickness, T, along a radial length, L, of the flip seal 106 except for at the inner periphery side portion 148. The inner periphery side portion 148 includes a substantially rounded corner 158 and an inclined flat portion 160 extending from the inboard surface 146 to the rounded corner 158 that is proximate the outboard surface 152. According to an embodiment, the inclined flat portion 160 may include a pitch, $\theta$, approximately equal to, for example, 30°-60°. Although the inclined flat portion 160 is shown extending from the inboard surface 146 to a rounded corner 158 that is proximate the outboard surface 152, it will be appreciated that the inclined flat portion 160 may extend from the outboard surface 152 to a rounded corner 158 proximate the inboard surface 146.

Figure 7:
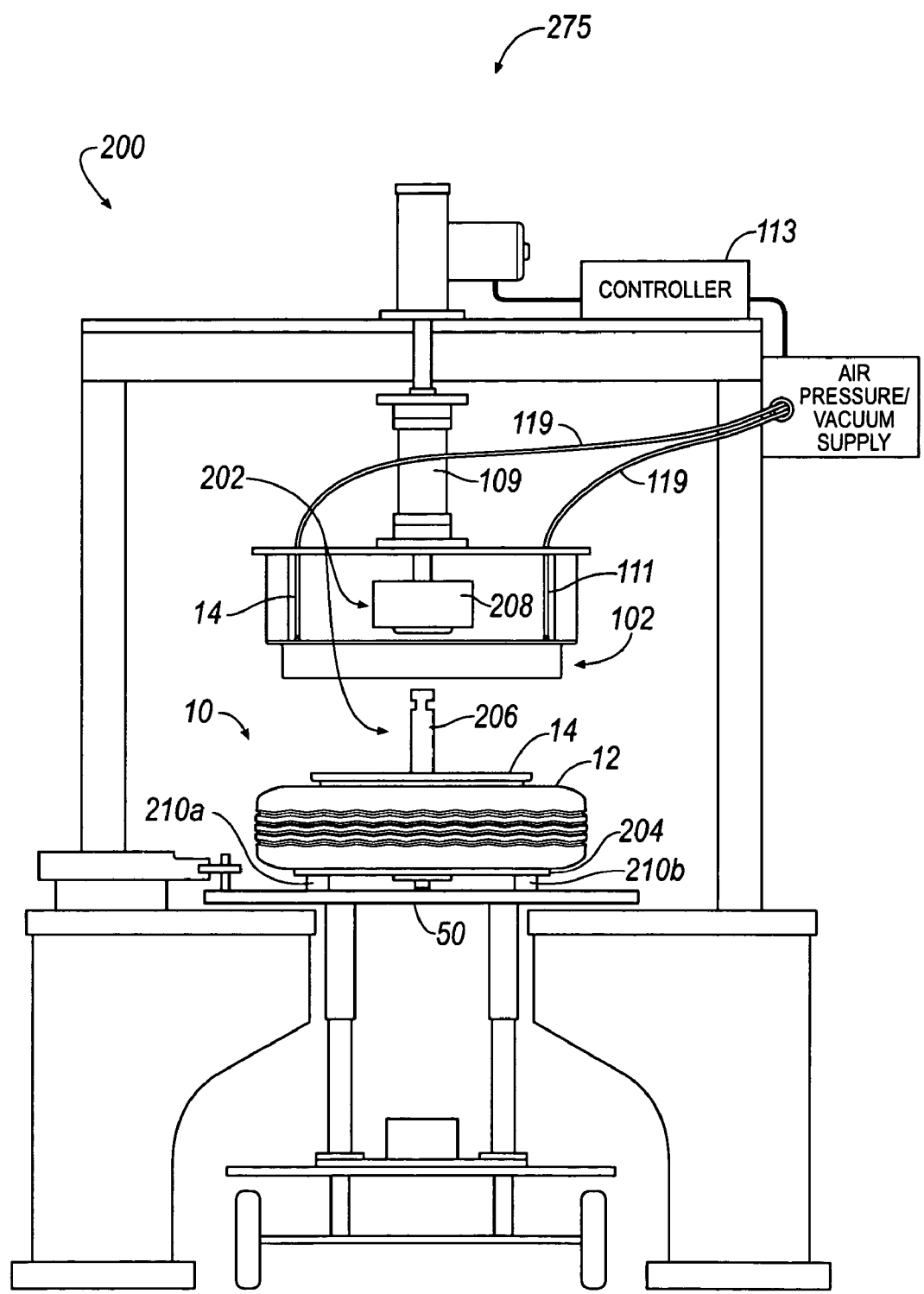
FIG. 7 is a front view of a tire/wheel assembly positioned on an assembly line cart that is located about an inflator system according to a second embodiment.

Referring now to FIG. 7, a center pull inflator device is shown generally at 200 according to an embodiment. A tire/wheel assembly is also shown generally at 10 and includes a tire 12 and a wheel 14 positioned over an assembly line cart 50. Together, the combination of the tire/wheel assembly 10, cart 50, and inflator device 200 defines a system 275 for inflating a tire 12 mounted to a wheel 14.

The center pull inflator device 200 includes the flip seal assembly 102 and the components at reference numerals 101-121 as described above in FIGS. 1-5F. The flip seal assembly 102 and components at reference numerals 101-121 function similarly as described above and therefore, for purposes of brevity, are not described in detail here.

In addition to the flip seal assembly 102 and components at reference numerals 101-121, the inflating device 200 also includes a tire/wheel assembly pull mechanism 202. The tire/wheel assembly pull mechanism 202 generally includes a tire/wheel assembly support member 204, an axial portion 206, and an axial portion locking device 208. Optional spacers 210a, 210b may be positioned between the cart 50 and support member 204.

Figure 8A:
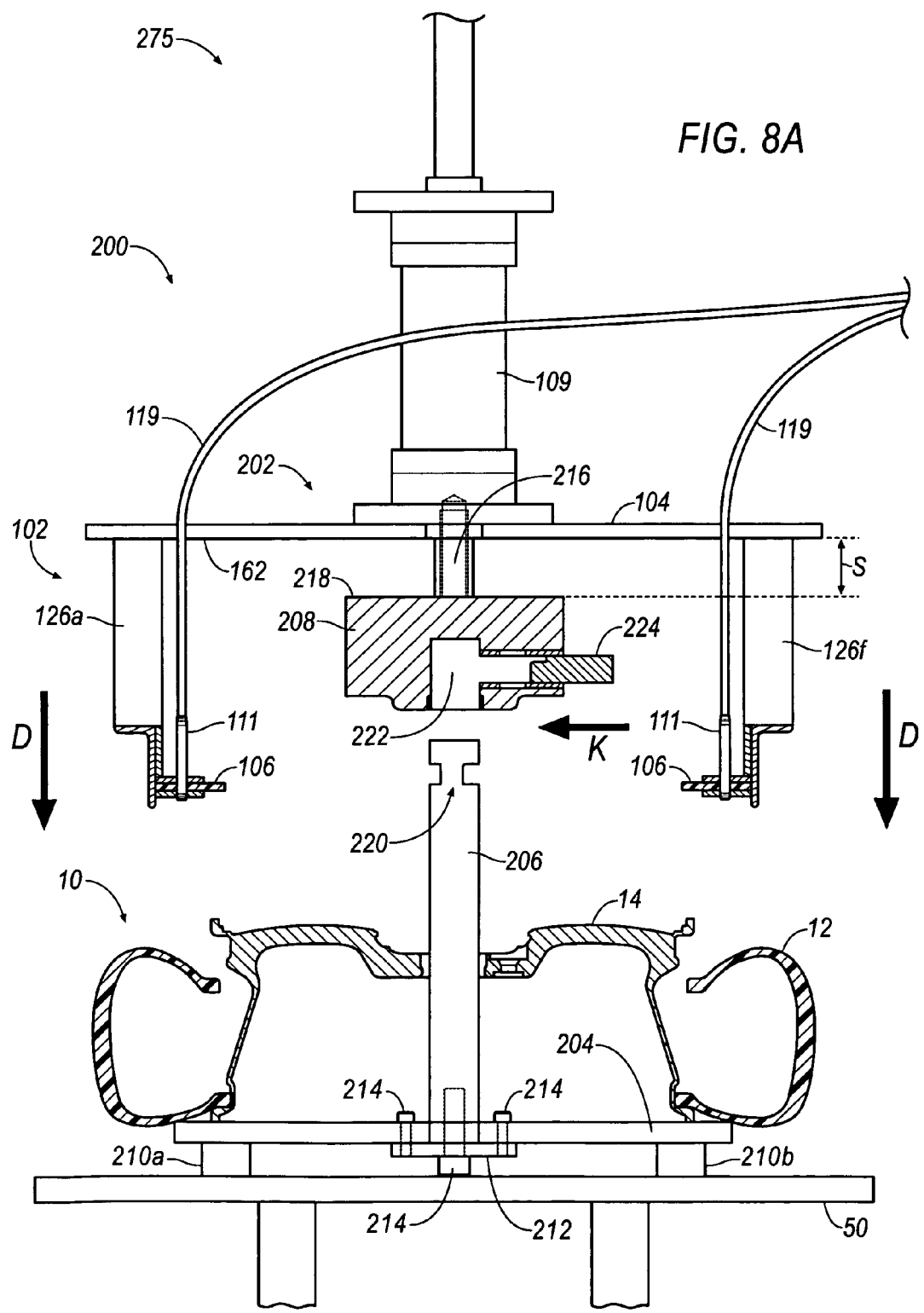
FIGS. 8A-8G illustrate cross-sectional views of the tire/wheel assembly and inflator system of FIG. 7 showing a method for inflating the tire/wheel assembly according to the second embodiment.

As seen in FIG. 8A, the support member 204 may be attached to the axial portion 206 with a fastening plate 212 and one or more fasteners 214. If desired, the support member 204 and axial portion 206 may be attached by any type of connection including, for example, a weld, or the like. As illustrated, the spacers 126a-126f may include a greater thickness than that illustrated in FIG. 1 to accommodate the dimensions of the pull mechanism 202.

An adjustment pin 216 may pass through the carrier plate 104 and into the plunger portion 109 to connect the axial portion locking device 208 to the plunger portion 109. As described in greater detail below, the controller 113 may control the adjustment pin 216 in a manner to reduce or increase a spacing, S, between an upper surface 218 of the axial portion locking device 208 and an inboard surface 162 of the carrier plate 104. The adjustment pin 216 may be, for example, threaded and mechanically driven, or, alternatively, hydraulically driven, however, the adjustment pin 216 is not limited to being threaded or mechanically or hydraulically adjusted and may include any desirable feature or functional adjustment means.

Figure 8B:
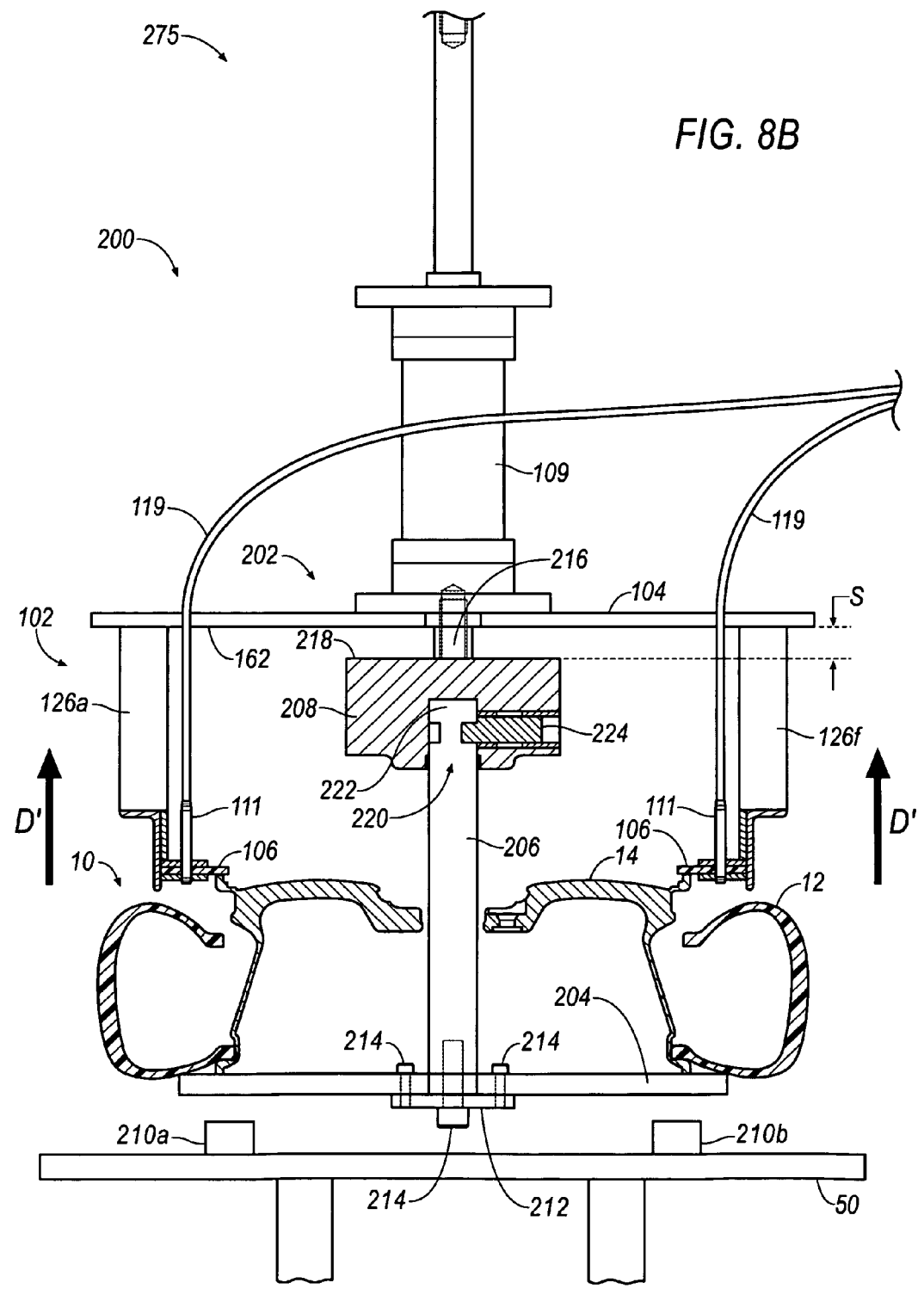
Figure 8C:
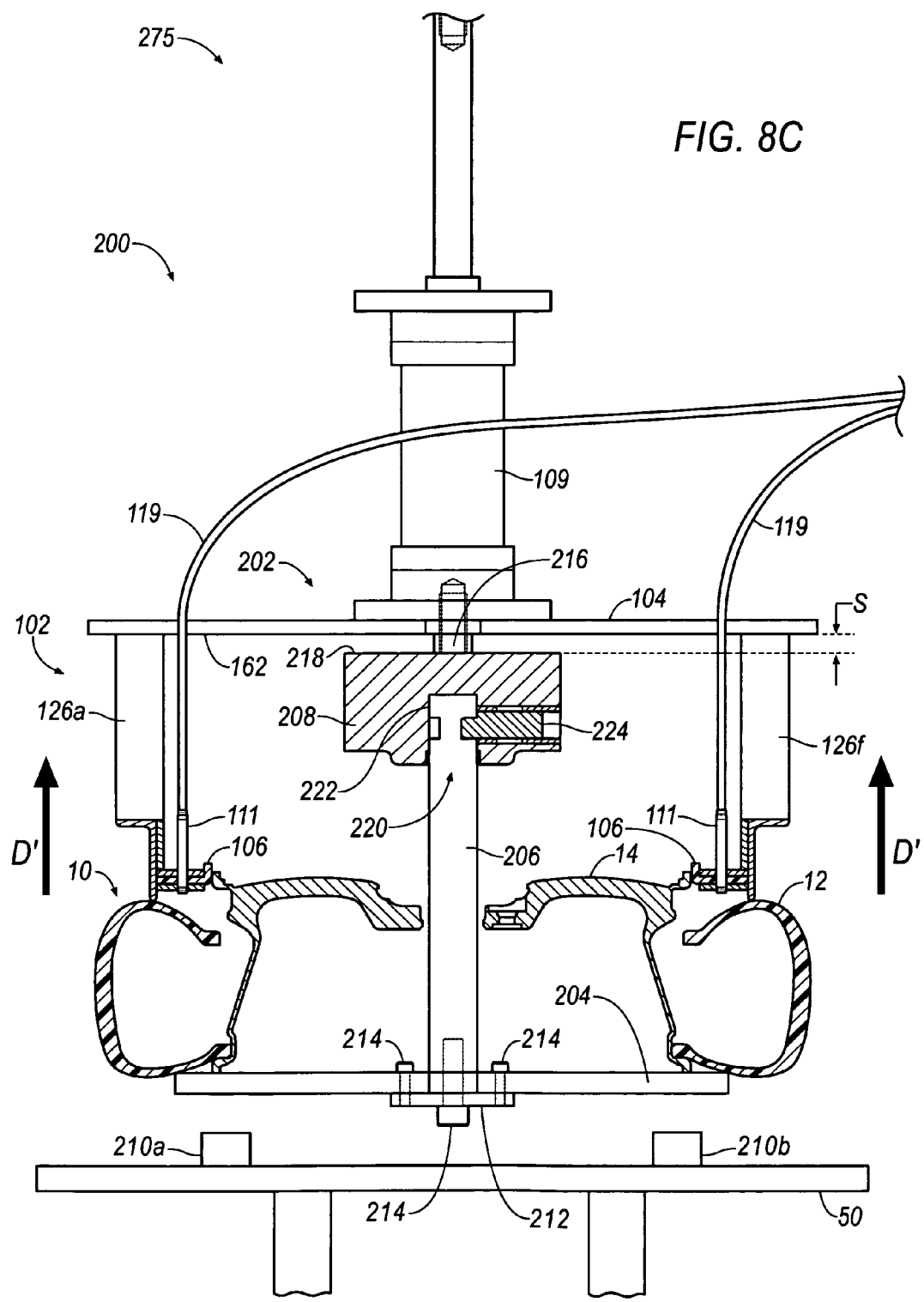
Figure 8D:
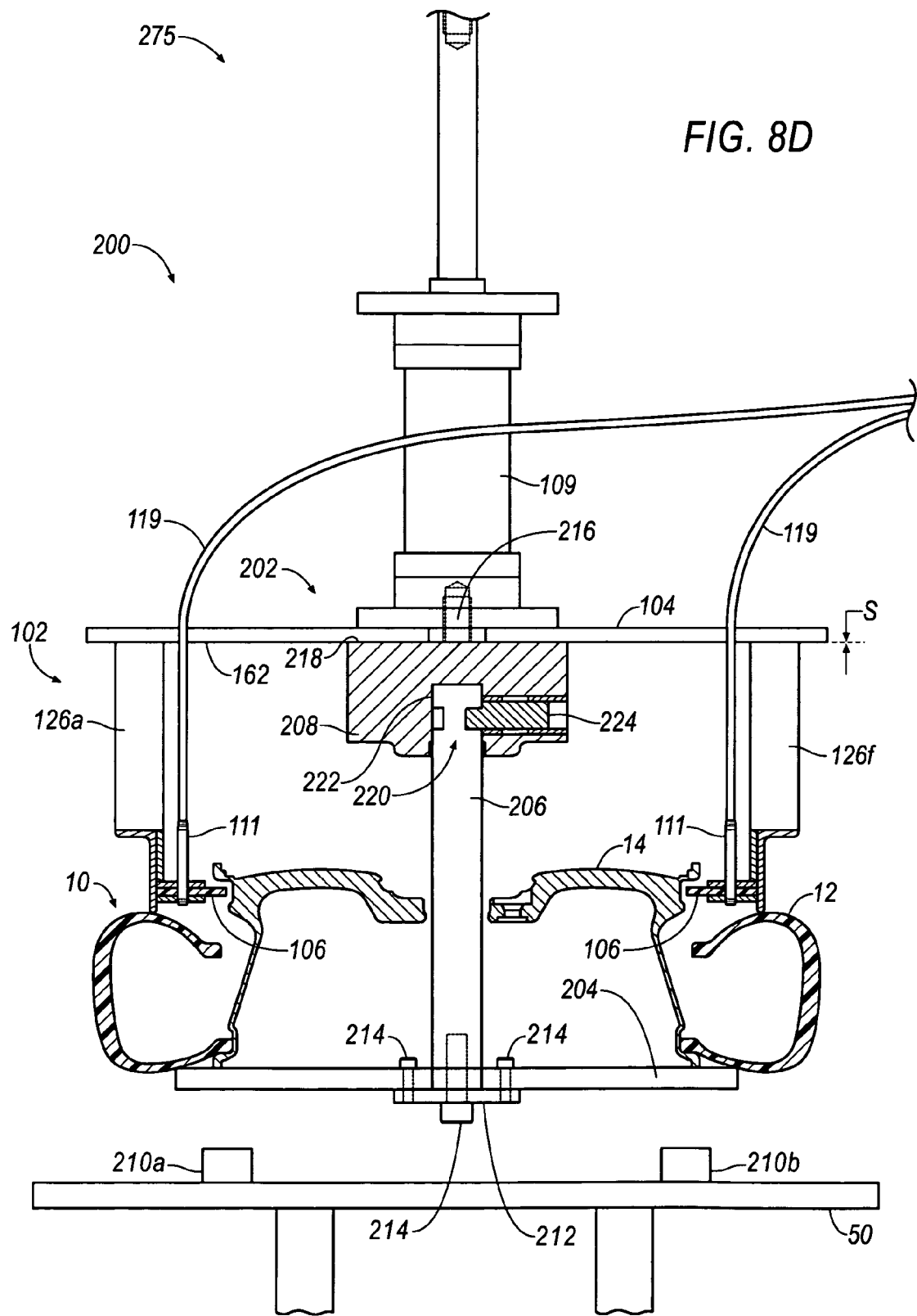
Figure 8E:
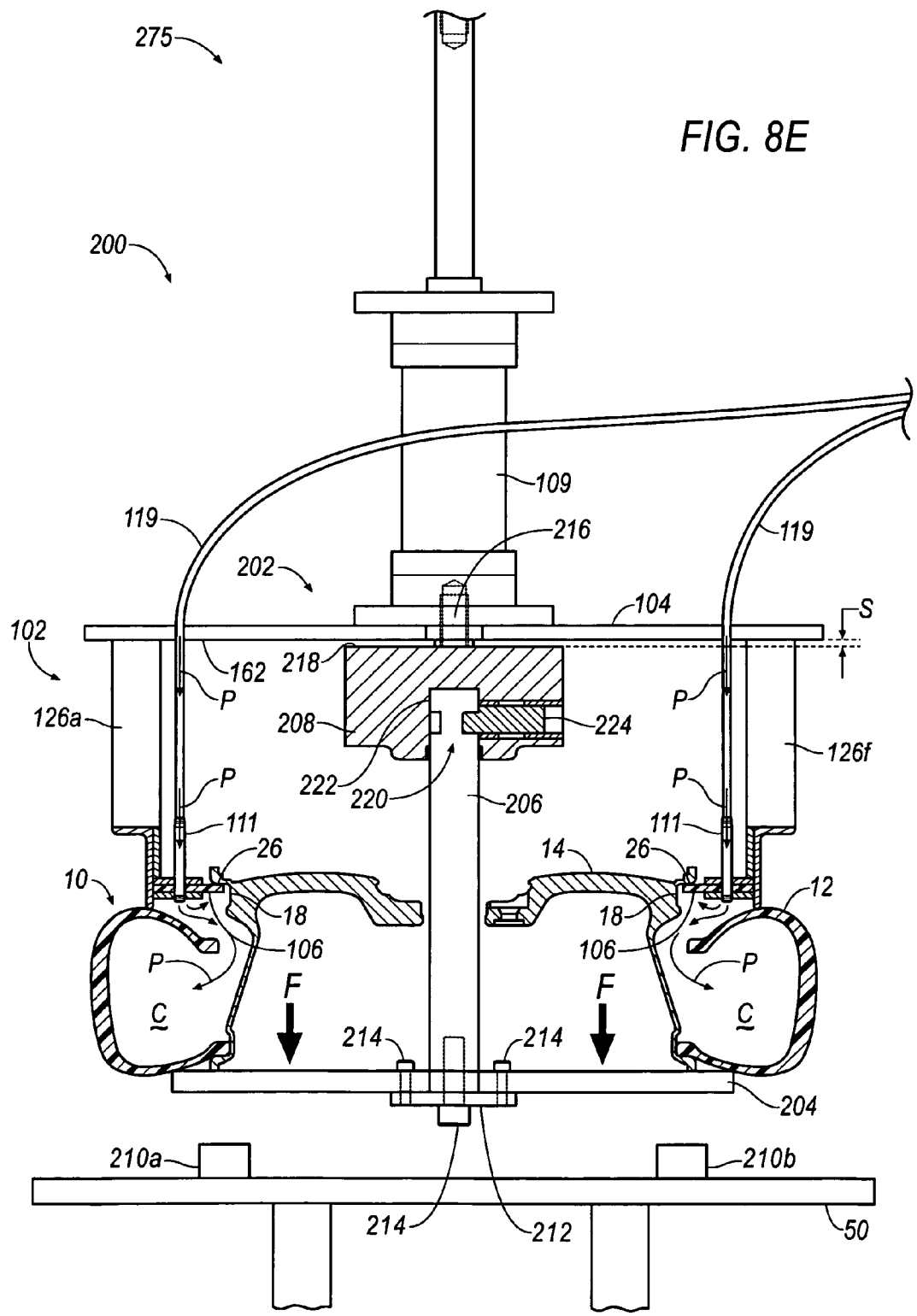
Figure 8F:
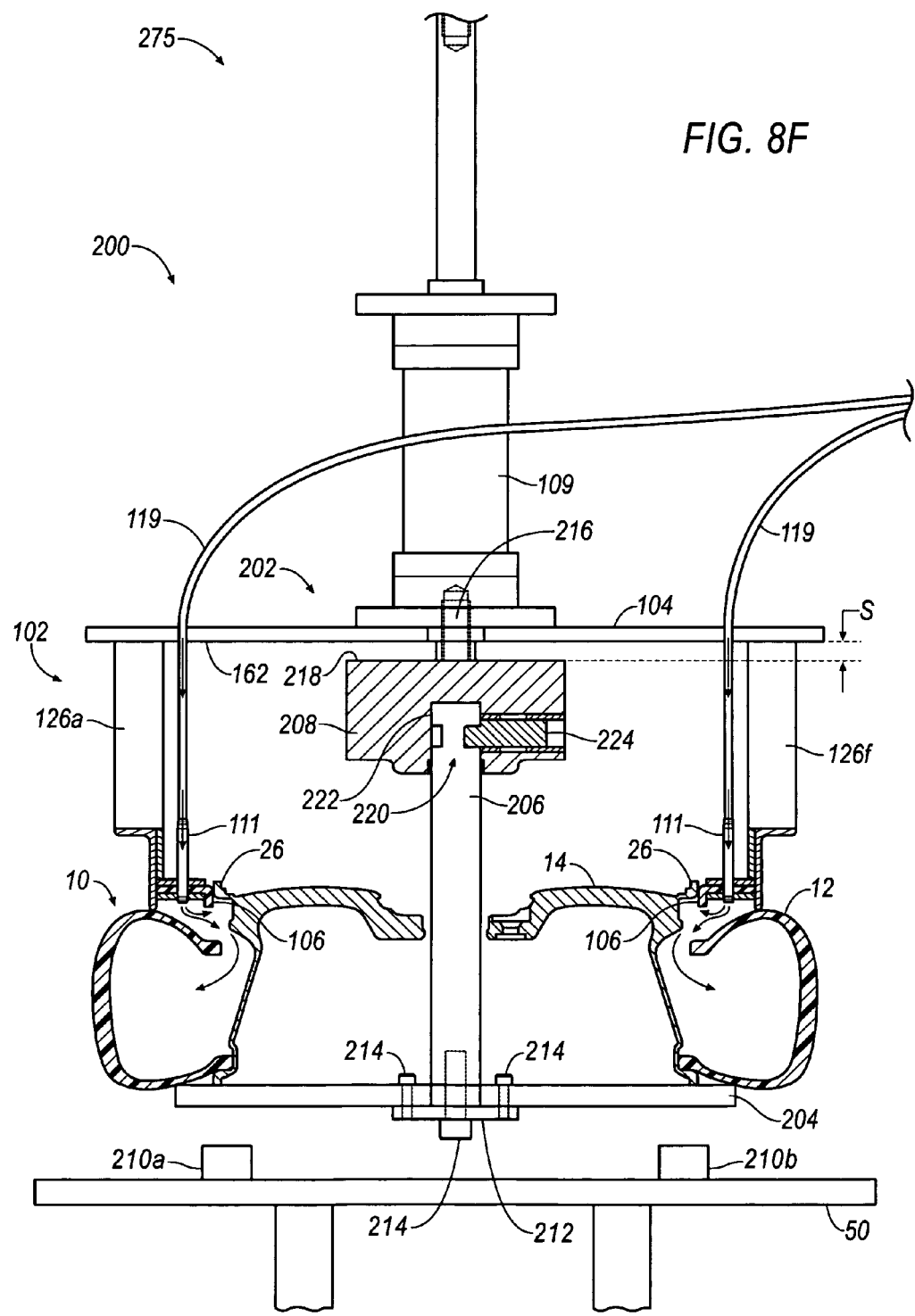
Figure 8G:
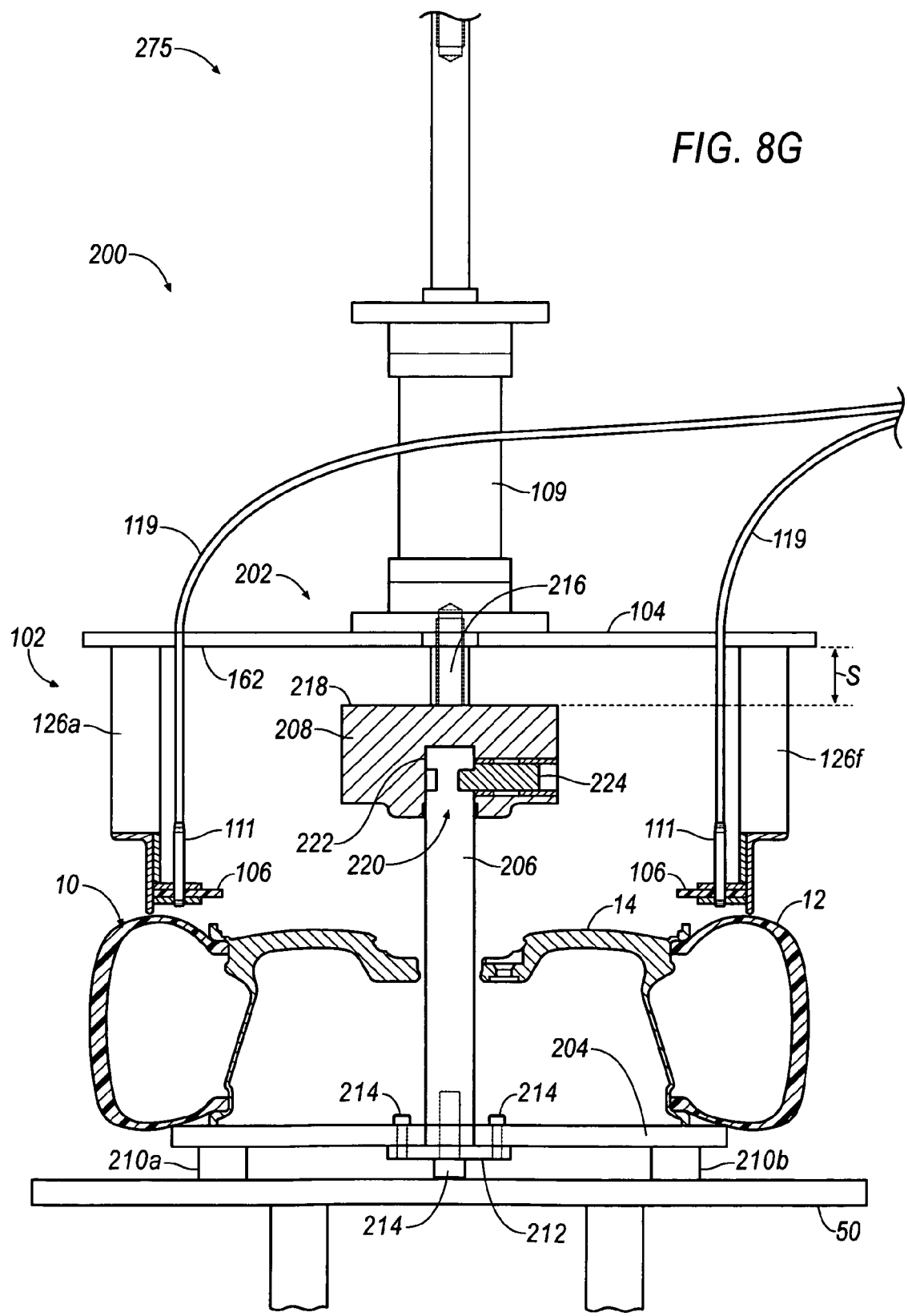

Referring now to FIGS. 7-8G, a method for inflating a tire 12 using the one or more inflators 111 and flip seal assembly 102 of an inflator device 200 is described according to an embodiment. First, as seen in FIG. 7, the plunger portion 109 and axial portion locking device 208 are suspended above a tire/wheel assembly 10 including an un-inflated tire 12 that is positioned over the cart 50. Then, as shown in FIG. 8A, the plunger portion 109 lowers, in the direction designated by the arrow, D, the axial portion locking device 208 so that a keyed portion 220 of the axial portion 206 is inserted in a bore 222 of the axial portion locking device 208. Once the keyed portion 220 is positioned as described above, the controller 113 may provide a signal that moves a key 224, in the direction designated by the arrow, K, of the axial portion locking device 208 from an unlocked position as shown in FIG. 8A to a locked position as shown in FIG. 8B.

Once in the key 224 is moved to the locked position as shown in FIG. 8B, the controller 113 causes the plunger portion 109 and/or the adjustment pin 216 to pull the tire/wheel assembly 10 in a direction according to the arrow, D' (which is opposite the direction according to the arrow, D), to raise the support member 204 from the spacers 210a, 210b or cart 50. Then, as shown in FIG. 8C, movement of the plunger portion 109 may cease and the controller 113 causes the adjustment pin 216 to draw the upper surface 218 of the axial portion locking device 208 toward an inboard surface 162 (according to the direction according to the arrow, D') of the carrier plate 104 thereby reducing the spacing, S, between the upper surface 218 and the inboard surface 162. By reducing the spacing, S, the flip seal 106 is moved as described above as shown in FIGS. 5A-5C.

Once the upper surface 218 and inboard surface 162 are adjacent one another, as shown in FIG. 8D, such that the spacing, S, is minimized, pressurized fluid, P, is introduced, as shown in FIG. 8E, by the one or more hoses 119. The introduction of the pressurized fluid, P, is similar to that as shown and described above in FIGS. 5C and 5D. As shown in FIG. 8E, the pressurized fluid, P, according to an embodiment, may cause the flip seal 106 to engage the inboard surface 26 of the flange of the wheel. As the circumferential cavity, C, of the tire 12 is pressurized by the pressurized fluid, P, the tire 12 may exert a force according to the direction of the arrow, F (which is similar in direction according to the arrow, D), against the support member 204 to draw the axial portion 206 and axial portion locking device 208 away from the carrier plate 104 so as to increase the spacing, S, between the upper surface 218 and inboard surface 162 so that the respective surfaces 162, 218 are no longer adjacent one another. Alternatively, spacing, S, may be created by programming controller to extend cylinder 109 (as cavity, C, is being pressurized).

Referring to FIGS. 8F and 8G, as the spacing, S, continues to increase, the flip seal 106 is moved in a manner as described and shown in FIGS. 5E and 5F such that the flip seal 106 is moved to the downward position of orientation and subsequently becomes disengaged from the inflated tire 12 of the tire/wheel assembly 10. As seen in FIG. 8G, the controller 113 may then cause the adjustment screw 216 to move the tire/wheel assembly 10 back to its original position as shown in FIG. 7 adjacent the optional spacers 210a, 210b or cart 50.

Figure 9A:
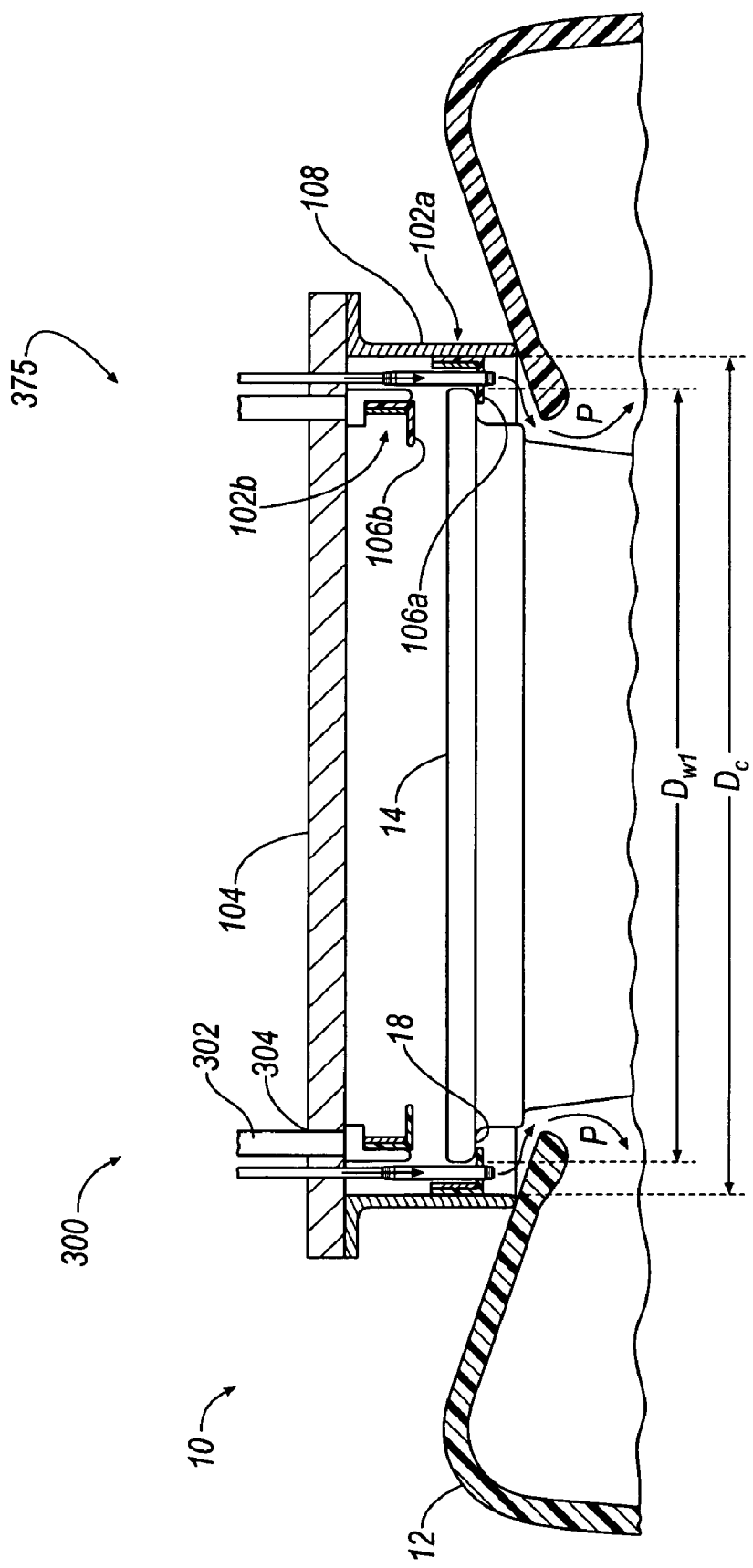
FIG. 9A is a cross-sectional view of a tire/wheel assembly and telescoping flip seal assembly according to a third embodiment.
Figure 9B:
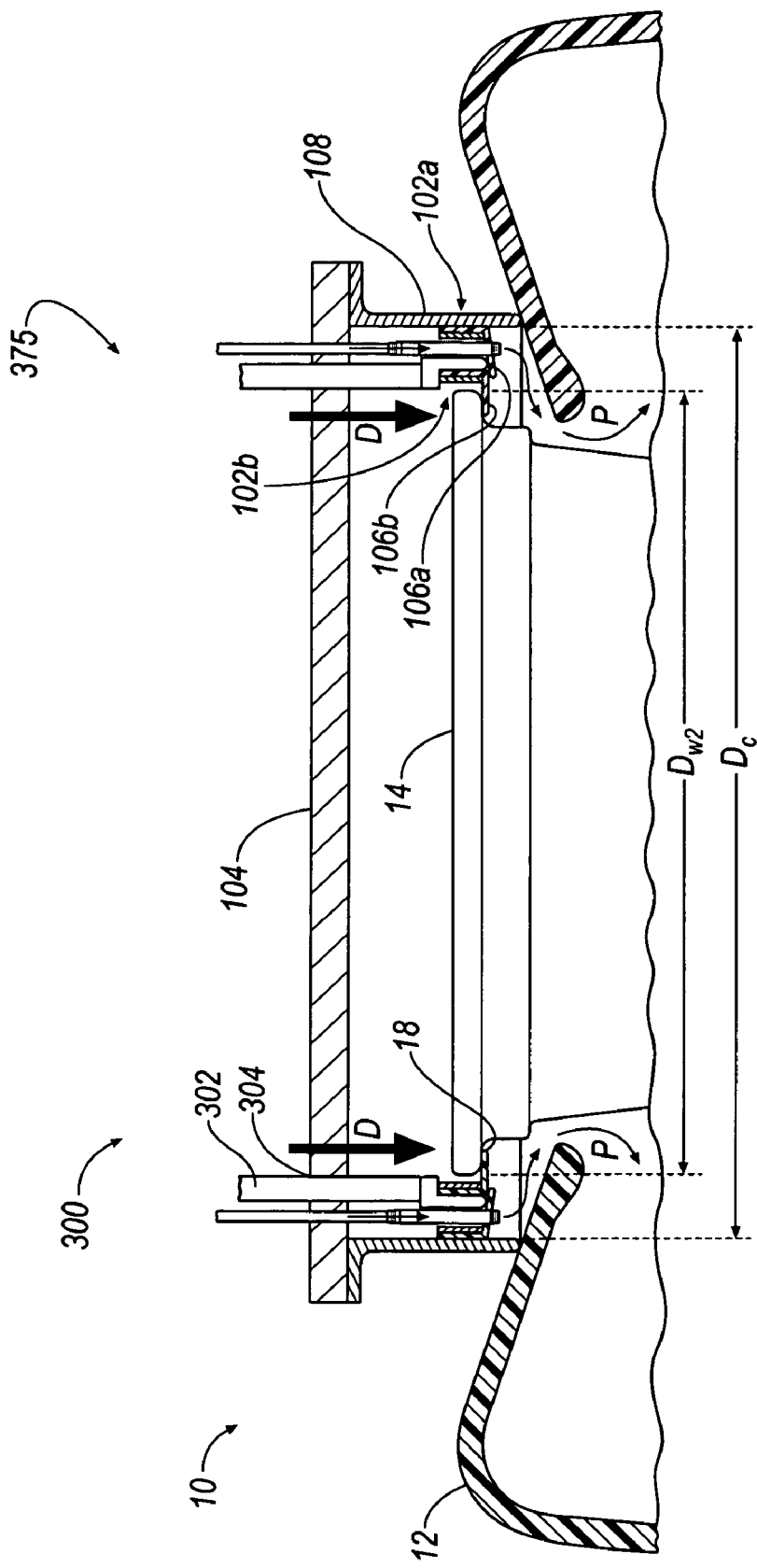
FIG. 9B is a cross-sectional view of a tire/wheel assembly and telescoping flip seal assembly according to the third embodiment.

Referring now to FIGS. 9A and 9B, an inflator device is shown generally at 300 according to an embodiment. A tire/wheel assembly is also shown generally at 10 and includes a tire 12 and a wheel 14 positioned over an assembly line cart 50 (not shown). Together, the combination of the tire/wheel assembly 10, cart 50, and inflator device 300 defines a system 375 for inflating a tire 12 mounted to a wheel 14.

The inflator device 300 includes the flip seal assembly 102 and the components at reference numerals 101-121 as described above in FIGS. 1-5F and are therefore not described in detail here. The inflator device 300, however, includes at least two flip seal assemblies 102 that are referred to as an outer flip seal assembly 102a and an inner flip seal assembly 102b. Although the outer and inner flip seal assemblies 102a, 102b function similarly to the flip seal assembly 102 as described above, the outer and inner flip seal assemblies 102a, 102b differ in that they share the carrier 108. The outer and inner flip seal assemblies 102a, 102b are also unique in relation to the earlier embodiment shown in FIGS. 1-8G in that the outer and inner flip seal assemblies 102a, 102b are arranged in a telescoping relationship to accommodate a variety of wheel diameters, $D_{w1}$ (FIG. 9A), $D_{w2}$ (FIG. 9B), respectively. As illustrated, the flip seal assemblies 102a, 102b are nested in a telescoping relationship within the carrier 108, which includes a diameter, $D_c$, that is greater than the wheel diameters, $D_{w1}$, $D_{w2}$.

First, as shown in FIG. 9A, the wheel bead seat 18 of the wheel 14 defines a wheel diameter, $D_{w1}$, that interfaces with an outer flip seal 106a of the inflator device 300. The outer flip seal 106a is part of the outer flip seal assembly 102a and is in a fixed position relative the carrier plate 104. Referring to FIG. 9B, the wheel bead seat 18 of the wheel 14 has a wheel diameter, $D_{w2}$, that is less than the diameter, $D_{w1}$. As illustrated, the wheel bead seat 18 interfaces with a inner flip seal 106b of the inflator device 300. The inner flip seal 106b is part of the inner flip seal assembly 102b and is movable relative the carrier plate 104. Movement of the inner flip seal 106b is enabled by movement of a plunger ring 302 that moves according to the direction of arrow, D, through an opening 304 formed in the carrier plate 104. Accordingly, as illustrated, the inner flip seal 106b of the inner flip seal assembly 102b engages the wheel bead seat 18 while the outer flip seal 106a seals against a portion of inner flip seal 102b to form an airtight seal therebetween.

Figure 10:
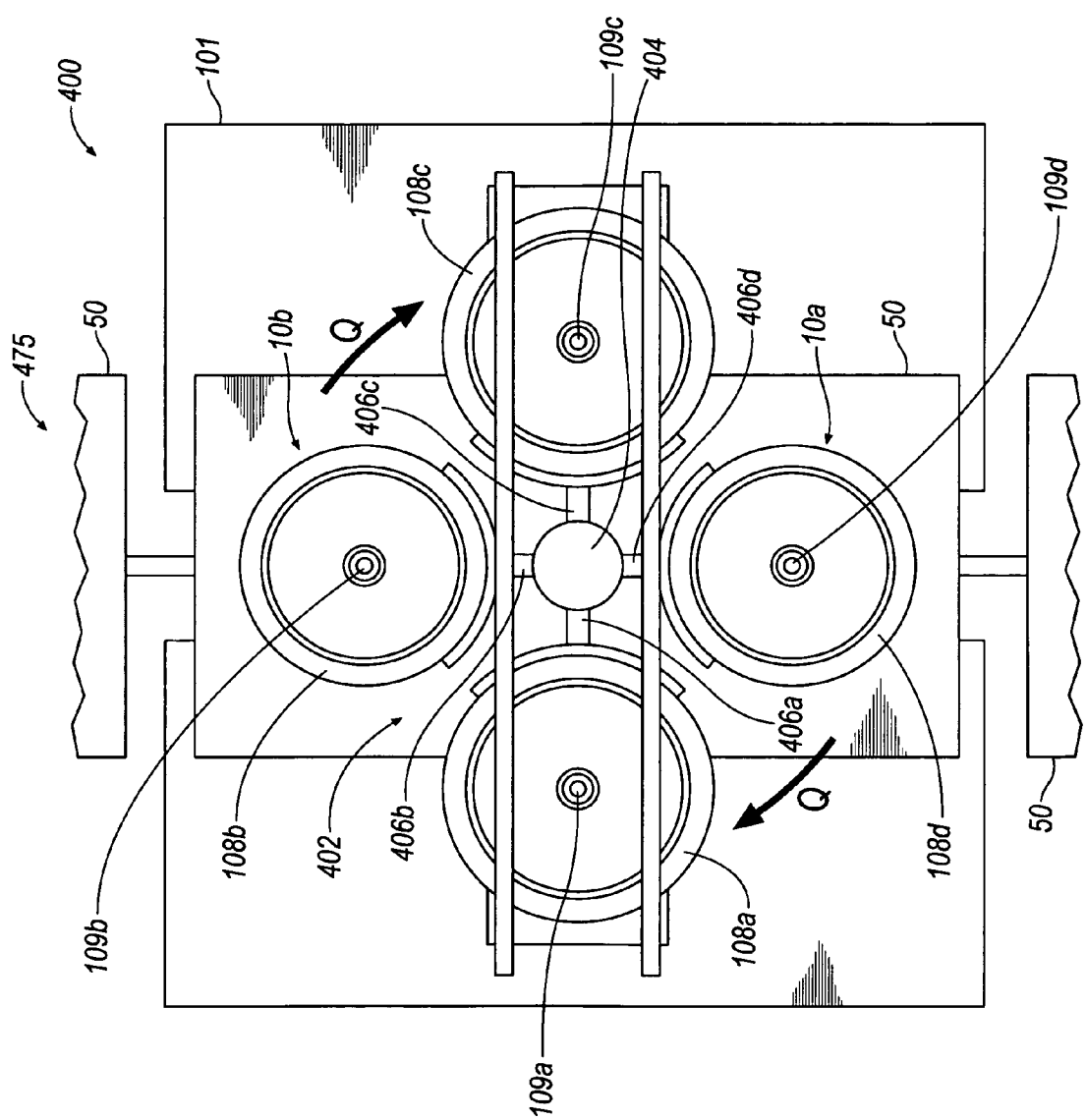
FIG. 10 is a top perspective view of a tire/wheel assembly and a carousel inflator rack system according to an embodiment.

Referring now to FIG. 10, an inflator device is shown generally at 400 according to an embodiment. Tire/wheel assemblies are also shown generally at 10a, 10b positioned over an assembly line cart 50. Together, the combination of the tire/wheel assemblies 10a, 10b, cart 50, and inflator device 400 defines a system 475 for inflating tires mounted to respective wheels.

The inflator device 400 generally includes a carousel 402 having a rotatable pole 404 with arms 406a-406d that support plunger portions 109a-109d and flip seal assembly (not shown). The plunger portions 109a-109d are similar to the plunger portion 109, and, the flip seal assemblies are similar to the flip seal assembly 102, as shown and described above in FIG. 2. The inflator device 400 also includes the components at reference numerals 101-121, as described above in FIGS. 1-5F, and therefore, for purposes of brevity, are not described in detail here.

Similar to the concept described in FIGS. 9A and 9B, the inflator device 400 also performs the function of mounting and inflating tires 12 to/on wheels 14 having different diameters (i.e., $D_{w1}$, $D_{w2}$). According to the illustrated embodiment, the diameter of carriers 108b, 108d associated with plunger portions 109b, 109d may be sized to accommodate the mounting and inflating of a tire (not shown) sized for a wheel (not shown) having a diameter, $D_{w1}$, while the carriers 108a, 108c associated with plunger portions 109a, 109d may be sized to accommodate the mounting and inflating of a tire (not shown) sized for a wheel (not shown) having a diameter, $D_{w2}$. Without having to provide a nested, telescoping assembly as shown in FIGS. 9A and 9B, the rotatable pole 404 of the carousel 402 may rotate, according to quarter-turn arrow, Q, approximately 90° to provide the desired diameter, $D_{w1}$, $D_{w2}$, for mounting and inflating the tires 12 to wheels 14 having a particular diameter, $D_{w1}$, $D_{w2}$.

Figure 11:
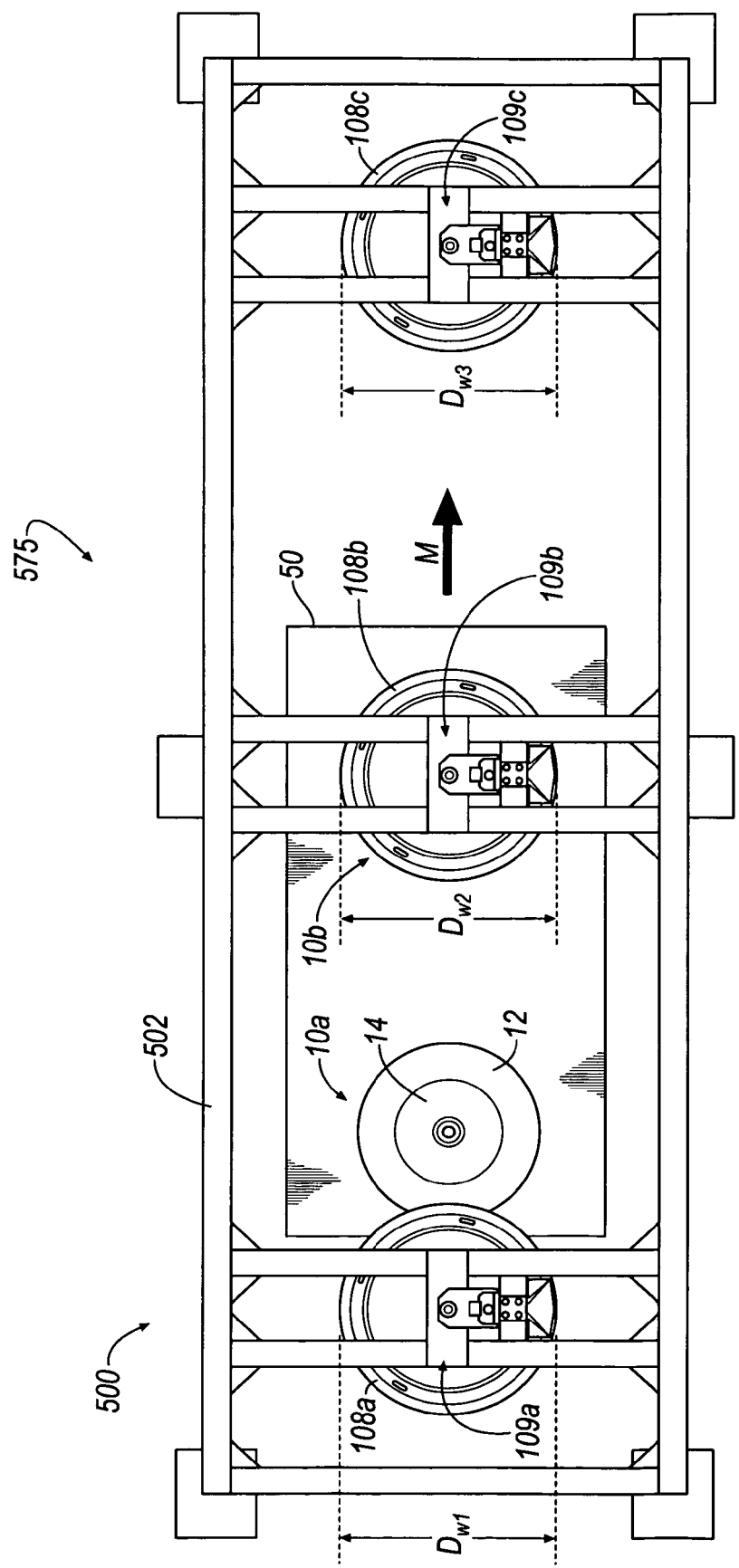
FIG. 11 is a top perspective view of a tire/wheel assembly and a first embodiment of a linear inflator rack system according to an embodiment.

Referring now to FIG. 11, an inflator device is shown generally at 500 according to an embodiment. Tire/wheel assemblies are also shown generally at 10a, 10b positioned over an assembly line cart 50. Together, the combination of the tire/wheel assemblies 10a, 10b, cart 50, and inflator device 500 defines a system 575 for inflating tires 12 mounted to respective wheels 14.

The inflator device 500 generally includes a track system 502 having first, second, and third plunger portions 109a-109c with respective flip seal assemblies (not shown). The plunger portions 109a-109c are similar to the plunger portion 109, and, the flip seal assemblies are similar to the flip seal assembly 102, as shown and described above in FIG. 2. The inflator device 500 also includes the components at reference numerals 101-121, as described above in FIGS. 1-5F, and therefore, for purposes of brevity, are not described in detail here.

Similar to the concept described in FIGS. 9A-10, the inflator device 500 also performs the function of mounting and inflating tires 12 to/on wheels 14 having different diameters (e.g., $D_{w1}$, $D_{w2}$). According to the illustrated embodiment, the diameter of carriers 108a, 108b, 108c associated with plunger portions 109a, 109b, 109c may be sized, respectively, to accommodate the mounting and inflating of a tire 12 sized for a wheel 14 having different diameters $D_{w1}$, $D_{w2}$, $D_{w3}$. As illustrated, the cart 50 may be moved according to the arrow, M, underneath the track system 502 to position the tire/wheel assemblies 10a, 10b under the desired carrier 108a, 108b, 108c corresponding, respectively, to the appropriate wheel size diameter $D_{w1}$, $D_{w2}$, $D_{w3}$.

Figure 12:
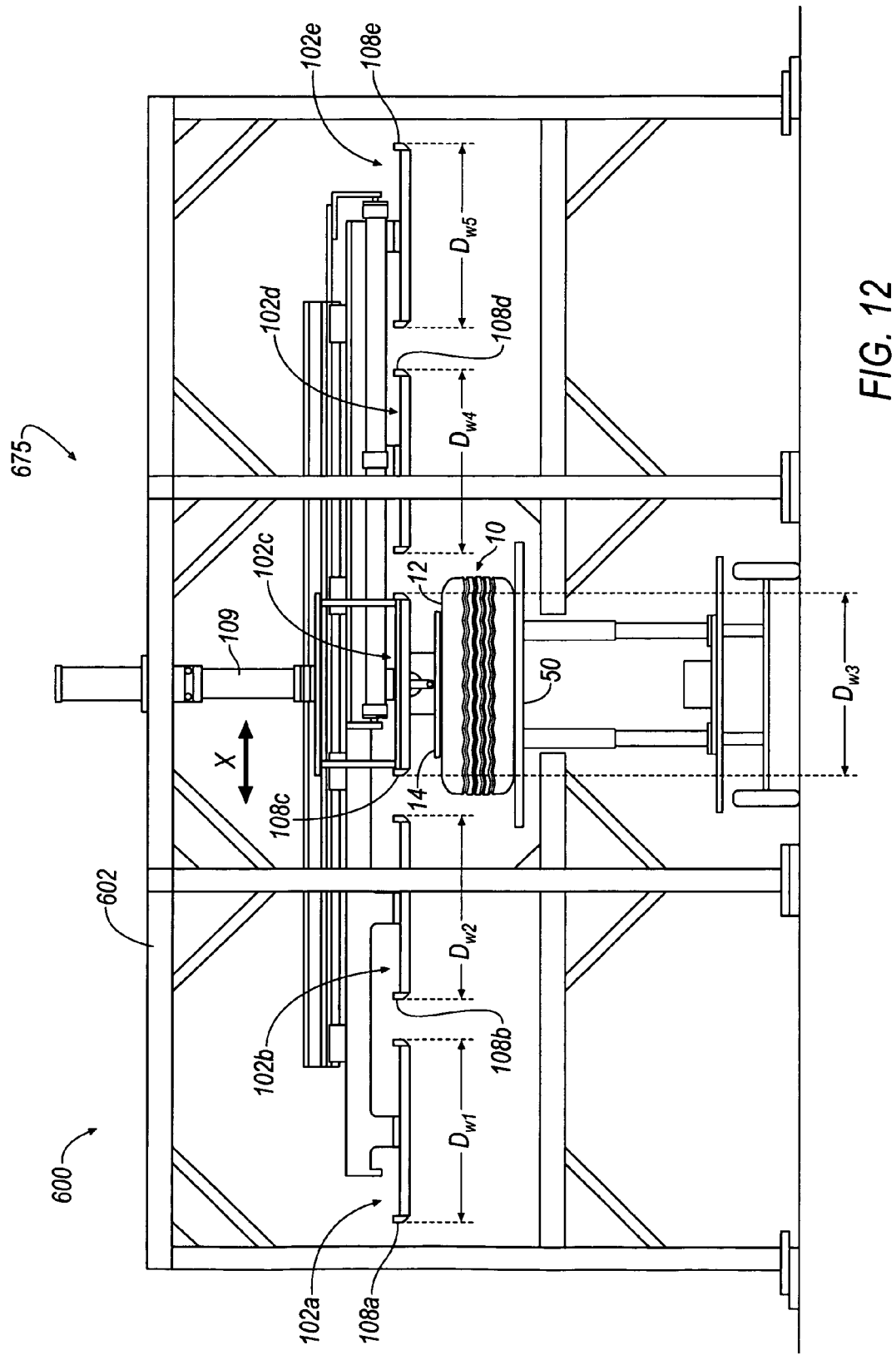
FIG. 12 is a front view of a tire/wheel assembly and a second embodiment of a linear inflator system according to an embodiment.

Referring now to FIG. 12, an inflator device is shown generally at 600 according to an embodiment. Tire/wheel assemblies are also shown generally at 10 and positioned over an assembly line cart 50. Together, the combination of the tire/wheel assemblies 10, cart 50, and inflator device 600 defines a system 675 for inflating tires 12 mounted to respective wheels 14.

The inflator device 600 generally includes a track system 602 having one plunger portion 109 and first, second, third, fourth, and fifth flip seal assemblies 102a-102e. The plunger portion 109 is similar to the plunger portion 109, and, the flip seal assemblies 102a-102e are similar to the flip seal assembly 102, as shown and described above in FIGS. 1-5F. The inflator device 600 also includes the components at reference numerals 101-121, as described above in FIGS. 1-5F, and therefore, for purposes of brevity, are not described in detail here.

Similar to the concept described in FIGS. 9A-11, the inflator device 600 also performs the function of mounting and inflating tires 12 to/on wheels 14 having different diameters (e.g., $D_{w1}$, $D_{w2}$). According to the illustrated embodiment, the diameter of each carrier 108a-108e may be sized, respectively, to accommodate the mounting and inflating of a tire 12 sized for a wheel 14 having different diameters $D_{w1}$, $D_{w2}$, $D_{w3}$, $D_{w4}$, $D_{w5}$, respectively. As illustrated, the cart 50 is held stationary as the positioning of the selected flip seal assembly 102a-102e is adjusted relative the plunger portion 109 about the track 602. Accordingly, the desired flip seal assembly 102a-102e is moved according to the arrow, X, underneath the track 602 to position the desired flip seal assembly 102a-102e in line with the plunger portion 109 and above the tire/wheel assembly 10 corresponding to the appropriate wheel size diameter $D_{w1}$, $D_{w2}$, $D_{w3}$, $D_{w4}$, $D_{w5}$.

The flip seal assembly 102 not only seals between a tire bead 16 and wheel bead seat 18 (FIGS. 3-5F) during an inflation, it also wipes the area of the bead seat area 18 to dislodge any lubricant or air bubbles that may residing therein. This wiping action may help to minimize, or even prevent, the entrapment of air bubbles and lubricant between the tire bead 16 and the wheel bead seat 18 during the tire insulation process. Additionally the wiping action may prove to be so effective so as to eliminate a separate process known as bead seating to eliminate entrapments (i.e. lubricant and/or air bubbles) between the wheel bead seat 18 and the tire bead 16 after the tire 12 has been fully mounted to the wheel 14.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An inflator device for inflating a tire-wheel assembly including a tire and a wheel, wherein the tire includes a tire bead, wherein the wheel includes a flange of a rim having: an outboard surface connected to an outboard corner connected to a circumferential perimeter connected to an inboard corner connected to an inboard surface comprising:

a seal assembly that maintains, while sealing from ambient pressure, an open air passageway between the tire bead and a wheel bead seat during an inflation procedure, wherein the wheel bead seat includes at least a portion of the inboard surface of the flange, wherein the seal assembly includes a seal that is disposed directly adjacent and sealingly-engages the wheel bead seat during the inflation procedure, wherein the seal includes a ring-shape having a flexible inner periphery, wherein the seal assembly is moved to/from first and second directions to cause the flexible inner periphery to move from a first at-rest position directly adjacent an outboard surface of the wheel bead seat to a first position of orientation directly adjacent a circumferential perimeter of the wheel bead seat to a second at-rest position from the first position of orientation directly adjacent the inboard surface of the wheel bead seat to a second position of orientation directly adjacent the circumferential perimeter of the wheel bead seat to the first at-rest position proximate the outboard surface of the wheel bead seat.

2. The inflator device according to claim 1, wherein the first position of orientation is a flipped position and the second position of orientation is a position, wherein the flipped position is substantially opposite that of the position.

3. The inflator device according to claim 1 further comprising a carrier including,
a rim portion encompassing a central axis,
a first radial portion extending away from the rim portion and central axis, and,
a second radial portion extending from the rim portion and toward the central axis.

4. The inflator device according to claim 3 further comprising:
a plunger portion that causes movements to/from the first and second directions,
a carrier plate moved in the first and second directions by the plunger portion, wherein the carrier plate translates the first and second direction movements to a top surface of the first radial portion to cause the movement of the flexible inner periphery described in claim 3.

5. The inflator device according to claim 3 further comprising a retainer, wherein the seal is positioned between the second radial portion and the retainer, wherein the seal, carrier, and retainer are joined by a plurality of fasteners.

6. The inflator device according to claim 4 further comprising one or more inflators extending through one or more passages formed in one or more of the seal, carrier, and retainer, wherein one or more inflators provide a pressurized fluid to a circumferential cavity bounded by the tire and a wheel through the open air passageway between the tire bead and the wheel bead seat.

* * * * *